US012580464B2

(12) United States Patent　　　　　(10) Patent No.: US 12,580,464 B2
McCutcheon et al.　　　　　　　　　　(45) Date of Patent: Mar. 17, 2026

(54) DYNAMIC POLE CONFIGURATION CONTROL

(71) Applicant: Multipolar Development Corporation, McCalla, AL (US)

(72) Inventors: Shaun Martin McCutcheon, Birmingham, AL (US); Babak Vaseghi, Edmonton (CA)

(73) Assignee: MULTIPOLAR DEVELOPMENT CORPORATION, McCalla, AL (US)

( * ) Notice: Subject to any disclaimer, the term of this patent is extended or adjusted under 35 U.S.C. 154(b) by 171 days.

(21) Appl. No.: 18/409,825

(22) Filed: Jan. 11, 2024

(65) Prior Publication Data

US 2024/0413724 A1　　Dec. 12, 2024

Related U.S. Application Data

(60) Provisional application No. 63/472,075, filed on Jun. 9, 2023.

(51) Int. Cl.
　*H02K 21/16*　　　(2006.01)
　*H02K 11/33*　　　(2016.01)
　*H02P 21/14*　　　(2016.01)
(52) U.S. Cl.
　CPC ............ *H02K 21/16* (2013.01); *H02K 11/33* (2016.01); *H02P 21/14* (2013.01); *H02K 2213/03* (2013.01)
(58) Field of Classification Search
　CPC .... H02K 21/16; H02K 11/33; H02K 2213/03; H02P 21/14; H02P 25/03; H02P 25/062;
(Continued)

(56) References Cited

U.S. PATENT DOCUMENTS

| 2008/0088200 A1 | 4/2008 | Ritchey | |
| 2021/0249981 A1* | 8/2021 | Ritchey | H02J 7/0014 |
| 2022/0311369 A1 | 9/2022 | Carvell | |

FOREIGN PATENT DOCUMENTS

| AU | 2021272454 A1 | 11/2022 |
| CN | 101820190 A | 9/2010 |

OTHER PUBLICATIONS

International Search Report and Written Opinion mailed on Sep. 16, 2024, received for PCT Application PCT/US2024/032918, filed on Jun. 7, 2024, 13 pages.

* cited by examiner

*Primary Examiner* — Antony M Paul
(74) *Attorney, Agent, or Firm* — XSENSUS LLP

(57) ABSTRACT

In some implementations, a pole configuration device may dynamically control pole configurations of an electric machine. The pole configuration device may receive input data indicating information associated with the electric machine. The pole configuration device may determine, based on the input data, a desired pole configuration of the electric machine. The pole configuration device may control, based on the desired pole configuration, magnetic polarities of multiple virtual poles, included in a field circuit of the electric machine, and an armature configuration, of an armature circuit of the electric machine, to create a set of effective poles. The set of effective poles may include one or more virtual poles, of the multiple virtual poles, that are associated with generating at least one of a flux, a speed, a torque, or a power related to the electric machine.

20 Claims, 15 Drawing Sheets

(58) Field of Classification Search
CPC ........ H02P 25/064; H02P 25/08; H02P 21/06;
H02P 21/18; H02P 21/20; H02P 21/22;
H02P 21/26; H02P 21/28; H02P 21/0021;
H02P 21/141; H02P 25/18
See application file for complete search history.

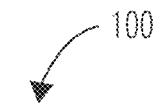
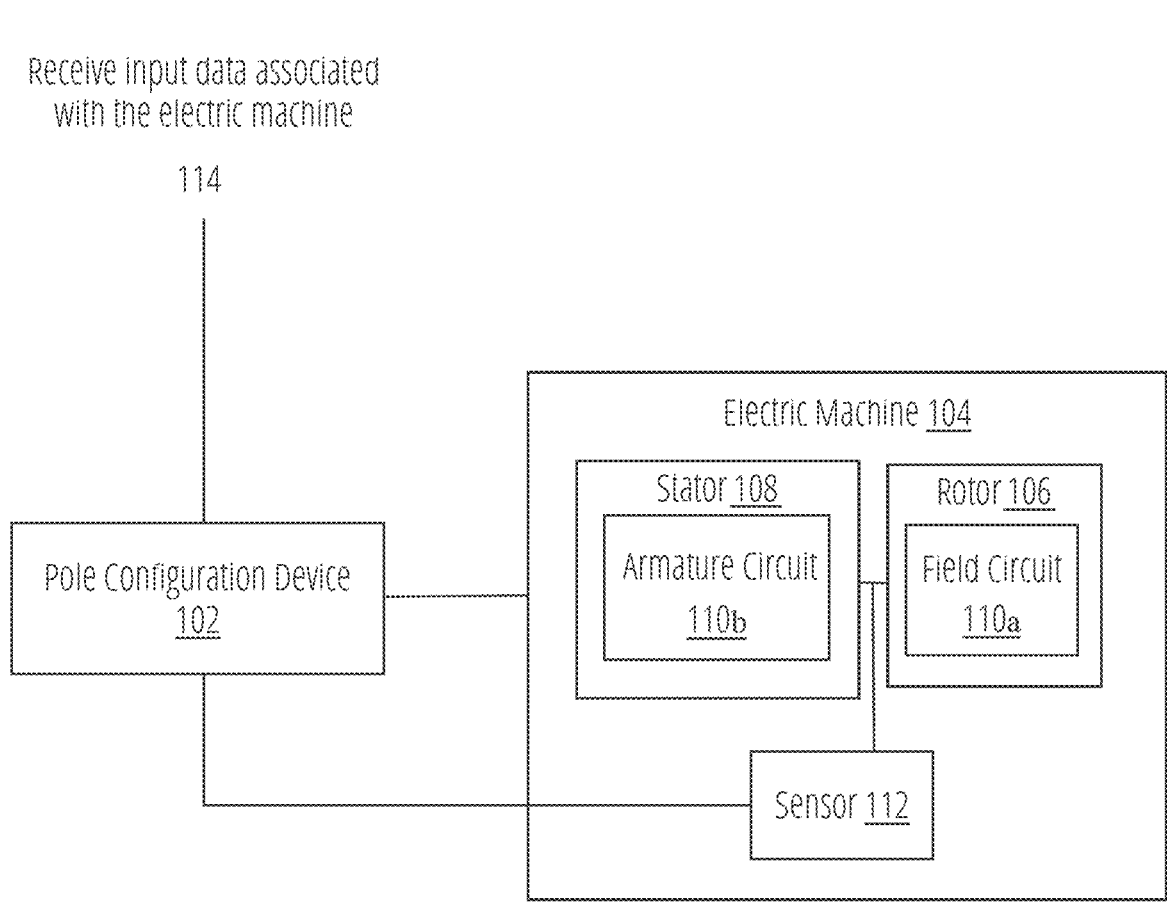
FIG. 1A

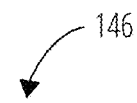
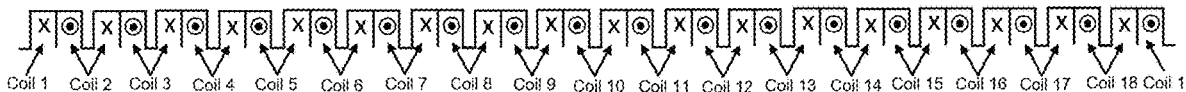
FIG. 1I

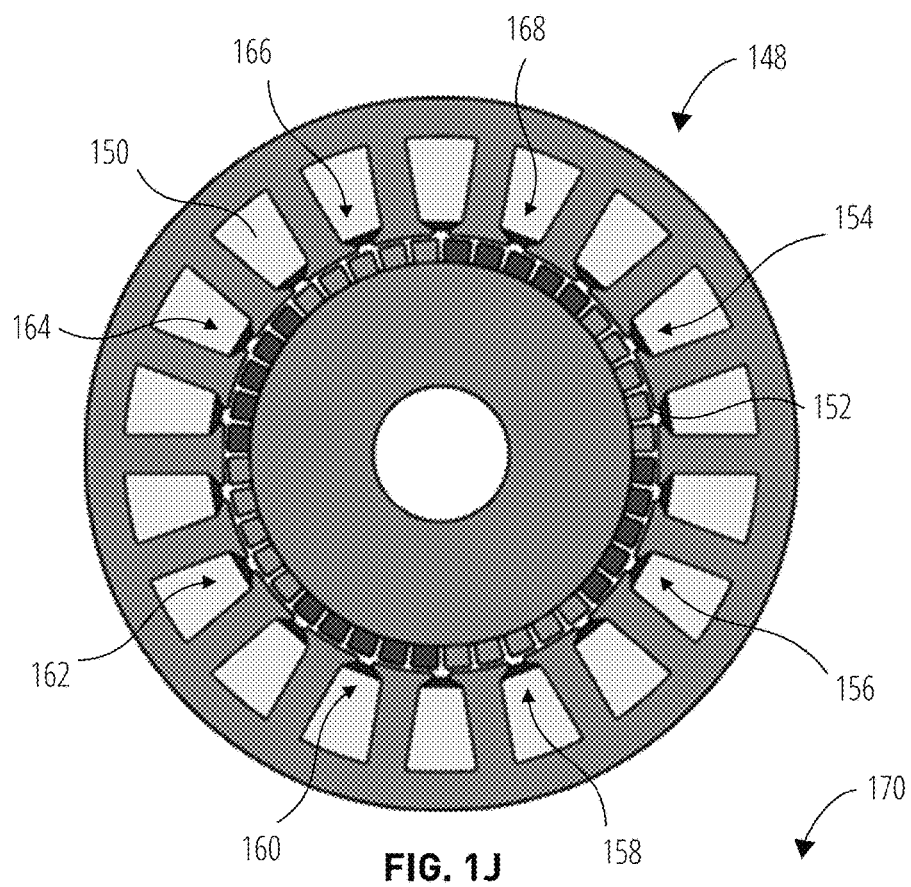
FIG. 1J
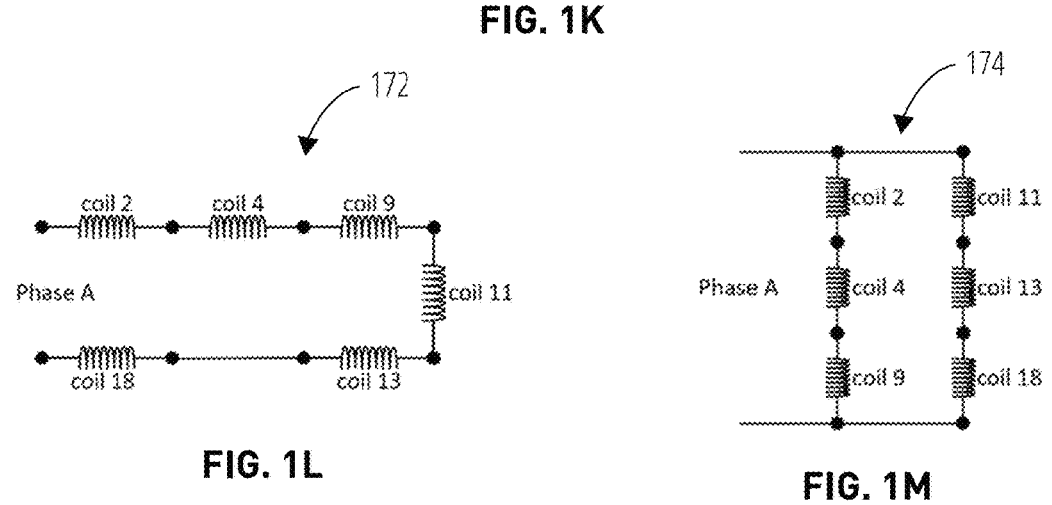
FIG. 1K
FIG. 1L
FIG. 1M

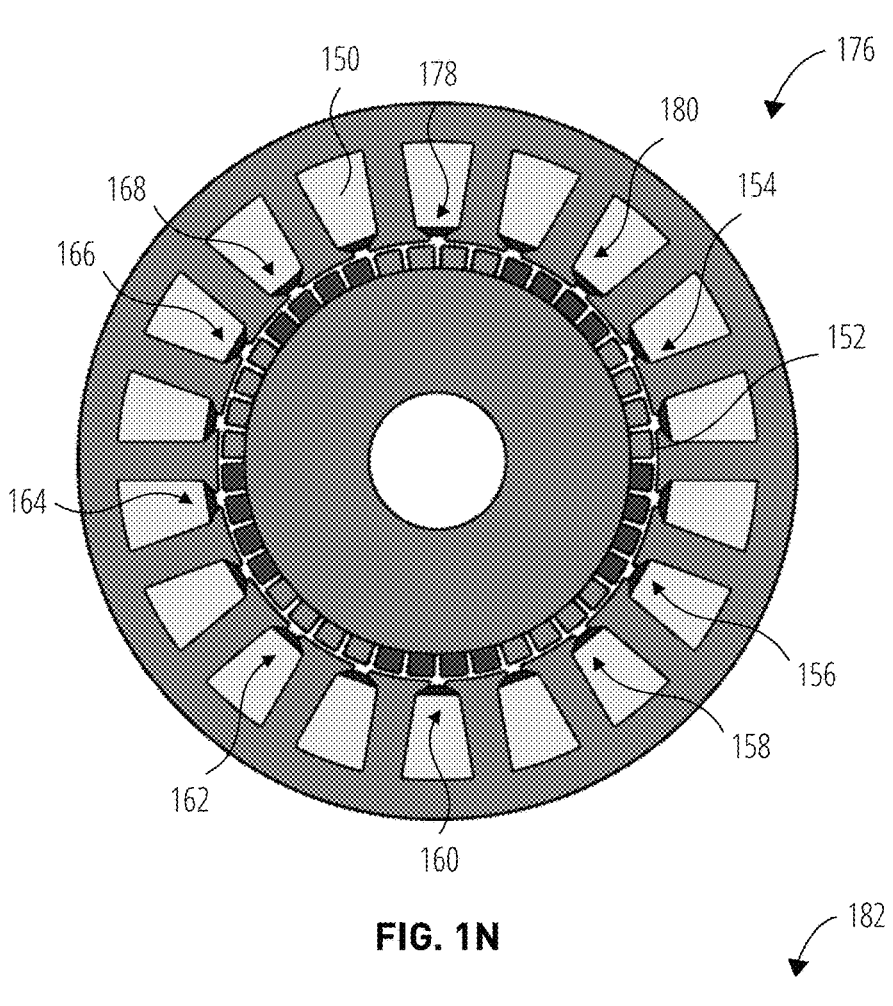
FIG. 1N
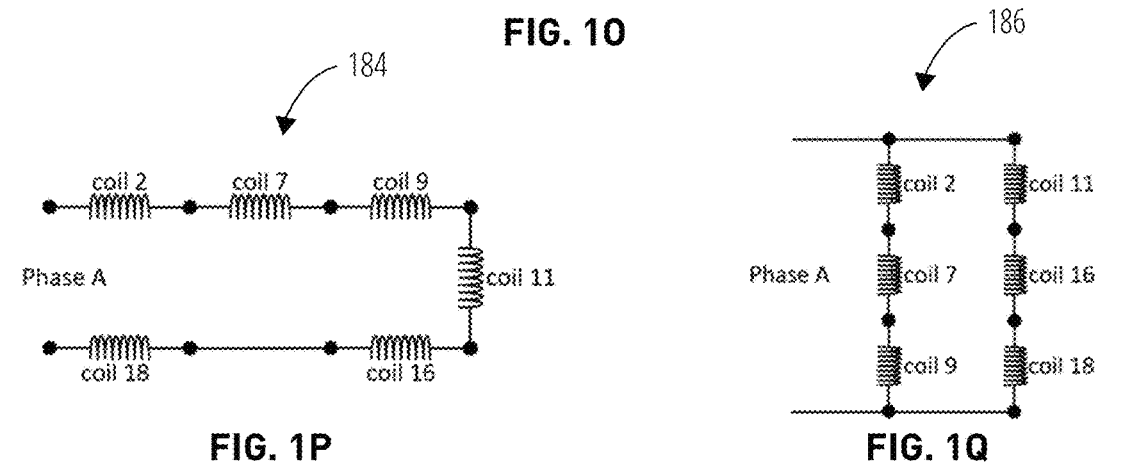
| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|----|----|----|----|----|----|----|----|----|
| B+A+ | A-C- | C-A- | A+C+ | C-B- | B+C+ | C+B+ | B-A- | A-B- | B+A+ | A-C- | C+A- | A+C+ | C-B- | B+C+ | C+B+ | B-A- | A+B+ |
FIG. 1O
FIG. 1P
Phase A
coil 2    coil 7    coil 9
coil 11
coil 18    coil 16
FIG. 1Q
Phase A
coil 2    coil 11
coil 7    coil 16
coil 9    coil 18

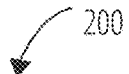
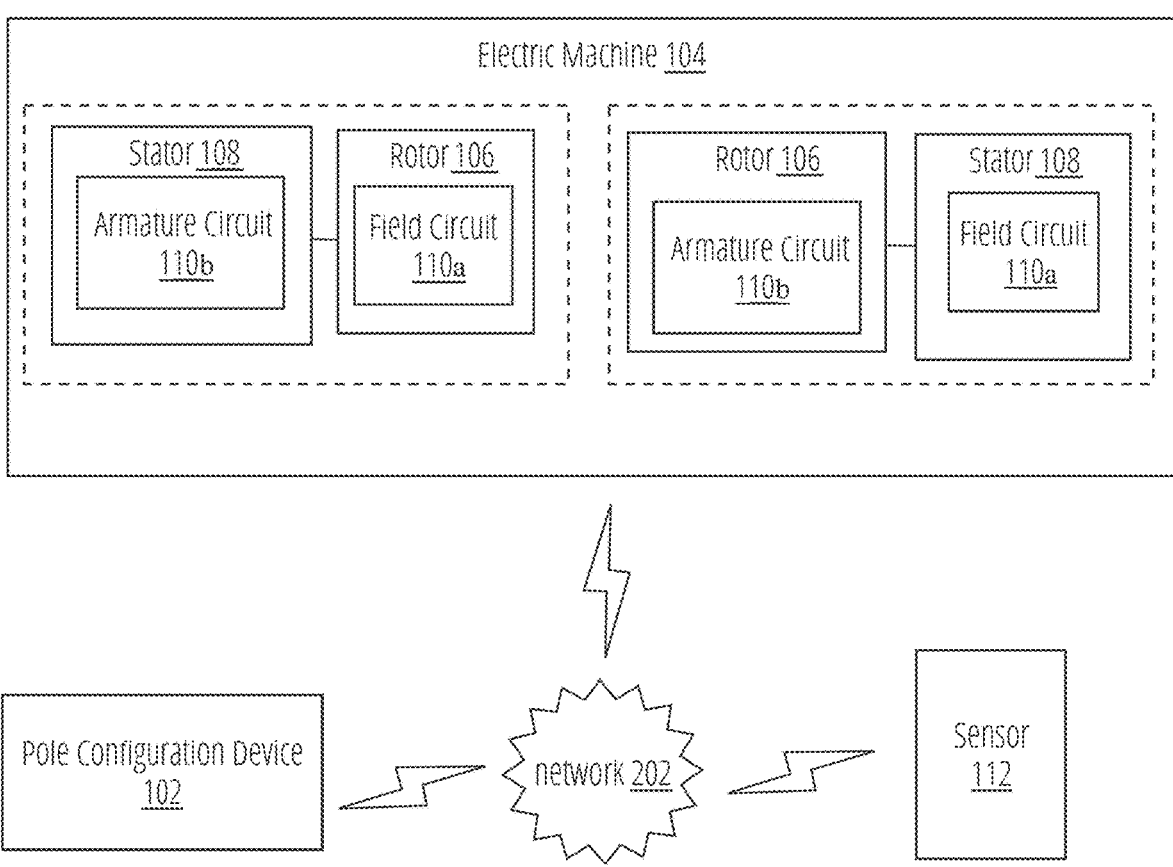
FIG. 2

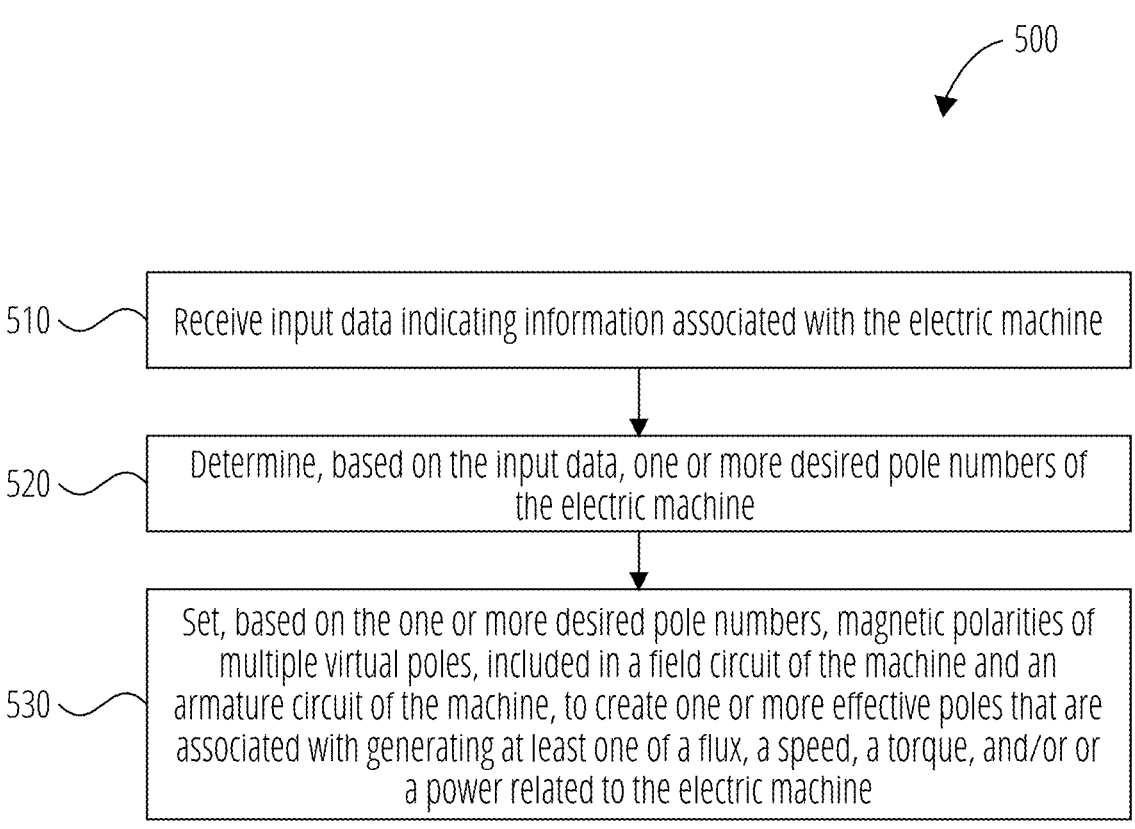

510 — Receive input data indicating information associated with the electric machine 520 — Determine, based on the input data, one or more desired pole numbers of the electric machine 530 — Set, based on the one or more desired pole numbers, magnetic polarities of multiple virtual poles, included in a field circuit of the machine and an armature circuit of the machine, to create one or more effective poles that are associated with generating at least one of a flux, a speed, a torque, and/or or a power related to the electric machine

FIG. 5

610 — Receive instructions to generate at least one of a reference torque, speed, and/or power associated with the system 620 — Polarize, using an appropriate duty cycle, at least one magnetic pole to a determined strength to control the torque, speed, and/or power associated with the system

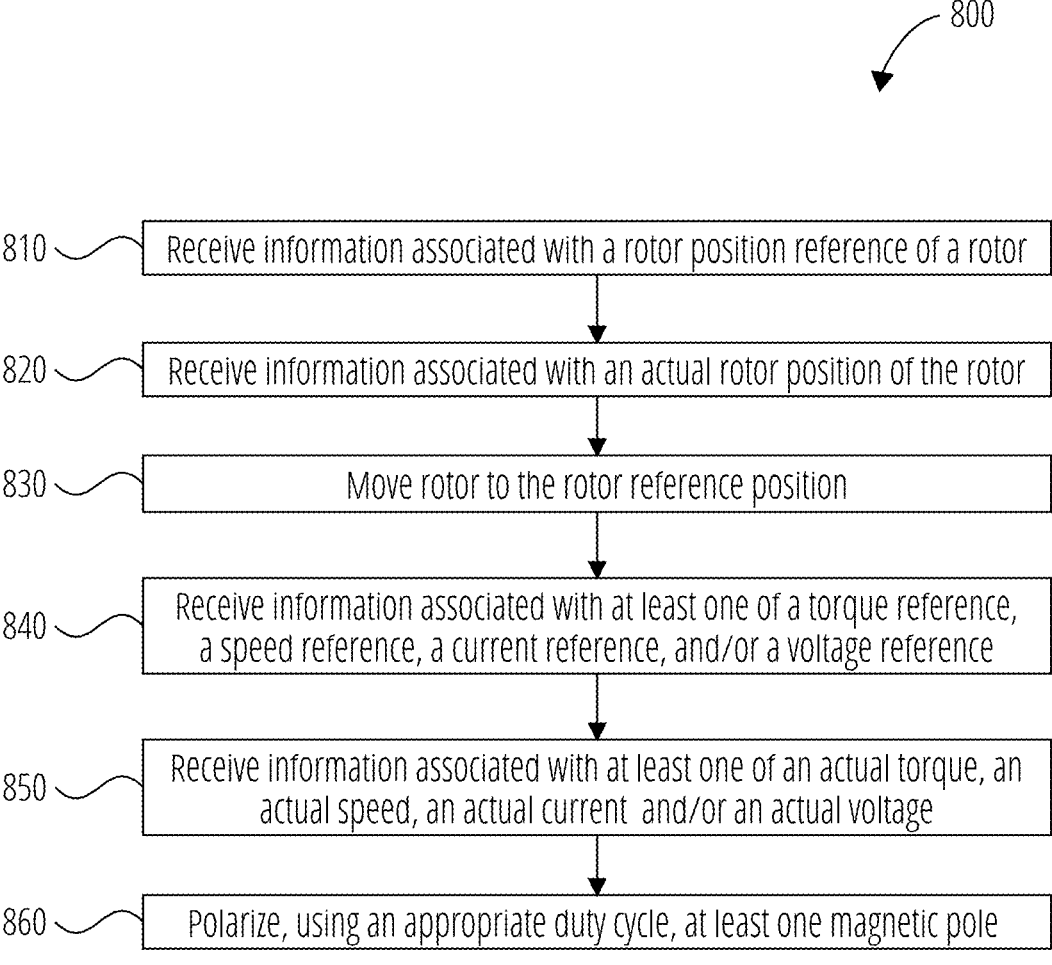

810   Receive information associated with a rotor position reference of a rotor

820   Receive information associated with an actual rotor position of the rotor

830   Move rotor to the rotor reference position

840   Receive information associated with at least one of a torque reference, a speed reference, a current reference, and/or a voltage reference 850   Receive information associated with at least one of an actual torque, an actual speed, an actual current and/or an actual voltage 860   Polarize, using an appropriate duty cycle, at least one magnetic pole

DYNAMIC POLE CONFIGURATION CONTROL

CROSS-REFERENCE TO RELATED APPLICATION

This application claims the benefit of U.S. Provisional Application No. 63/472,075, filed Jun. 9, 2023, which is incorporated herein by reference in its entirety.

BACKGROUND

An electric machine uses electromagnetic interaction between rotor components and stator components to convert electrical energy into mechanical energy and/or convert mechanical energy into electrical energy. Electric motors typically have a fixed number of poles, which requires significant re-tooling (e.g., complete re-tooling) or replacement of an existing motor if operational requirements change that necessitate a different number of poles.

SUMMARY

Some implementations described herein relate to a system for dynamically controlling pole configurations of an electric machine. The system may include a field circuit, of the electric machine, including multiple virtual poles; an armature circuit of the electric machine; one or more memories; and one or more processors, communicatively coupled to the one or more memories, configured to: receive input data indicating information associated with the electric machine; determine, based on the input data, a desired pole configuration of the electric machine; and control, based on the desired pole configuration, magnetic polarities of the multiple virtual poles and an armature configuration of the armature circuit to create a set of effective poles, wherein the set of effective poles includes one or more virtual poles, of the multiple virtual poles, that are associated with generating at least one of a flux, a speed, a torque, or a power related to the electric machine.

Some implementations described herein relate to a method for dynamically controlling pole configurations of an electric machine. The method may include receiving, by a controller, input data indicating information associated with the electric machine; determining, by the controller and based on the input data, one or more desired pole numbers of the electric machine; and setting, based on the one or more desired pole numbers, magnetic polarities of multiple virtual poles, included in a field circuit of the machine, and an armature circuit of the electric machine, to create one or more effective poles, wherein the one or more effective poles include one or more virtual poles, of the multiple virtual poles, that are associated with generating at least one of a flux, a speed, a torque, or a power related to the electric machine.

Some implementations described herein relate to a non-transitory computer-readable medium that stores a set of instructions. The set of instructions, when executed by one or more processors of a pole configuration device, may cause the pole configuration device to receive input data indicating information associated with an electric machine; determine, based on the input data, a desired pole configuration of the electric machine; control, based on the desired pole configuration, magnetic polarities of multiple virtual poles, included in a field circuit of the electric machine, and an armature circuit, of the electric machine, for a first time period to create a first set of effective poles and a second time period to create a second set of effective poles; wherein the first set of effective poles includes a first set of virtual poles, of the multiple virtual poles, that are associated with generating at least one of a first flux, a first speed, a first torque, or a first power related to the electric machine, and wherein the second set of effective poles includes a second set of virtual poles, of the multiple virtual poles, that are associated with generating at least one of a second flux, a second speed, a second torque, or a second power related to the electric machine.

BRIEF DESCRIPTION OF THE DRAWINGS

FIG. 2 is a diagram of an example environment in which systems and/or methods described herein may be implemented, in accordance with some embodiments of the present disclosure.

FIG. 5 is a flowchart of an example process associated with systems and methods for dynamically controlling pole configurations of an electric machine, in accordance with some embodiments of the present disclosure.

FIG. 8 is a flowchart of an example method associated with controlling torque, speed, or power of a multipolar electric machine, in accordance with some embodiments of the present disclosure.

DETAILED DESCRIPTION OF EXAMPLE EMBODIMENTS

Figure 1B:
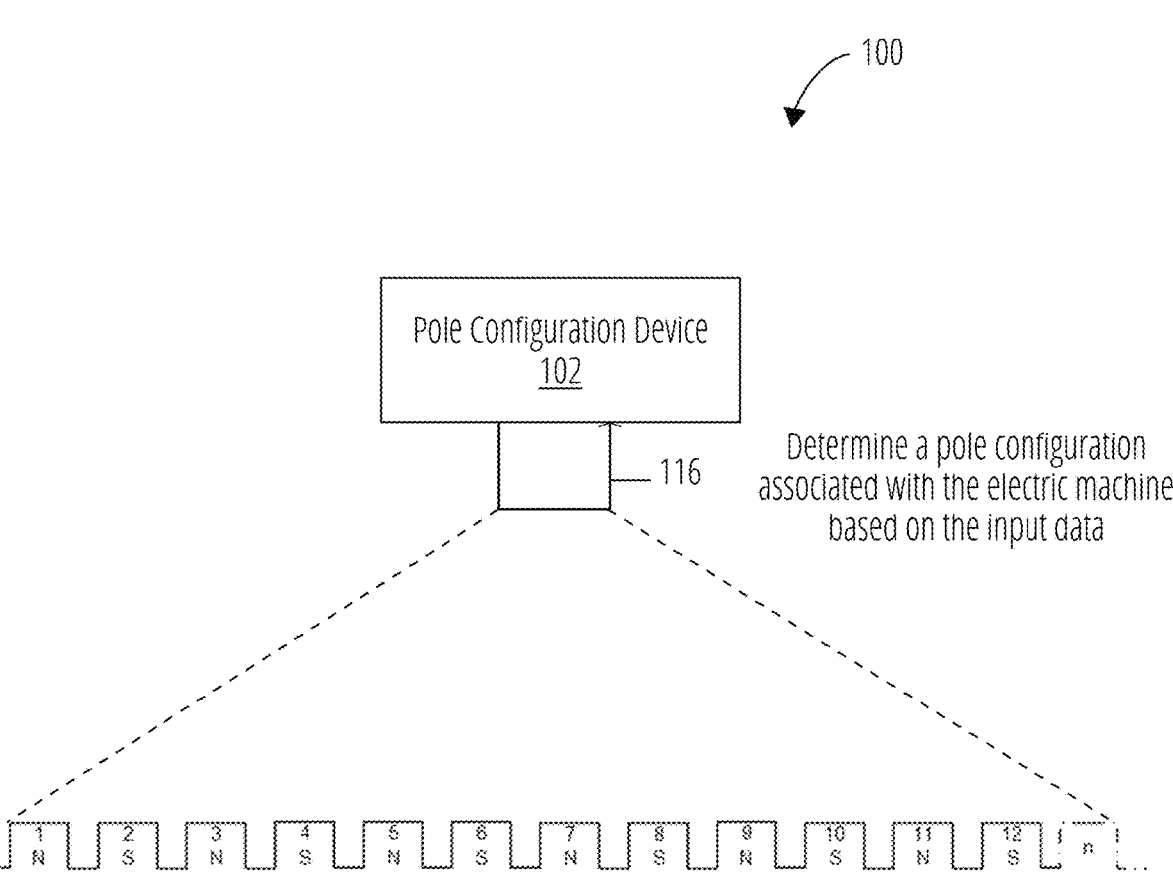
FIGS. 1A-1R are diagrams of an example associated with systems and methods for dynamically controlling pole configurations of an electric machine, in accordance with some embodiments of the present disclosure.

The following detailed description of example implementations refers to the accompanying drawings. The same reference numbers in different drawings may identify the same or similar elements.

Magnetic poles (e.g., pairs of north and south magnetic poles within a stator or rotor of an electric machine) may generate magnetic fields that interact with one another (e.g., to drive motion associated with the electric machine). As an example, the electric motor may be characterized as a 2-pole motor (e.g., which includes 2 magnetic poles and are associated with high-speed operation), a 4-pole motor (e.g., which includes 4 magnetic poles which are associated with balanced speed and torque), a 6-pole motor (e.g., which includes 6 magnetic poles and are associated with moderate speed and torque), an 8-pole motor (e.g., which includes 8 magnetic poles and are associated with high torque), and a 12-pole motor (e.g., which includes 12 magnetic poles and are associated with high speed and low torque).

Accordingly, the number of magnetic poles determines speed and torque characteristics associated with the electric motor. However, an electric motor typically has a fixed number of magnetic poles, which presents some challenges and drawbacks. For example, fixed-pole electric motors have a limited speed-torque range (e.g., because fixed-pole motors have a predetermined number of magnetic poles based on a particular speed-torque range), have limited versatility (e.g., because changes to operational requirements associated with the electric motor requires reconfiguration or replacement of the electric motor), and have complex and costly control systems for speed operation (e.g., achieving variable speeds in fixed-pole motors requires complex and costly control systems).

In some cases, an electric motor may be a dual-pole motor (e.g., a two-pole motor). However, dual-pole motors present some challenges and drawbacks. For example, dual-pole motors have limited speed control (e.g., the dual-motor motor can switch only between two speed-torque settings), have reduced efficiency (e.g., switching between the two pole introduces inefficiencies), have complex and costly control systems (e.g., sophisticated control algorithms and feedback systems are required to maintain stable operation of the dual-pole motor while switching between poles), and have limited applications (e.g., applications that require two distinct speed-torque settings).

Some implementations described herein provide systems and/or methods for dynamically controlling pole configurations (e.g., pole numbers) of an electric machine. The electric machine may include a rotor, a stator, a field circuit, an armature circuit (e.g., an armature winding), and a sensor. The field circuit may include multiple virtual poles. The armature circuit may include one or more armature configurations (e.g., that are based one or more pole configurations of the electric machine). In some implementations, the system may receive input data indicating information associated with the electric machine. The system may determine, based on the input data, a desired pole configuration of the electric machine. The system may control, based on the desired pole configuration, magnetic polarities of the multiple virtual poles and an armature configuration of the armature circuit to create a set of effective poles.

The set of effective poles may include one or more virtual poles, of the multiple virtual poles, that are associated with generating at least one of a flux, a speed, a torque, or a power related to the electric machine. As an example, the one or more virtual poles may include a group of virtual poles that have a matching magnetic polarity (e.g., each virtual pole, of the one or more virtual poles, may have a same magnetic polarity).

The one or more virtual poles may include a group of virtual poles that are located consecutively in the field circuit. In some implementations, the one or more virtual poles may include at least one virtual pole having a first magnetic polarity, at least one virtual pole having a second magnetic polarity that is different than (e.g., opposite to) the first magnetic polarity, and at least one virtual pole having a zero magnetic polarity (e.g., a null magnetic polarity).

In some implementations, the magnetic polarities of the one or more virtual poles may be based on at least one of a constant current input, a linear current input, a non-linear current input, and/or an impulse current input. In some implementations, the electric machine may include one or more rotors and one or more stators. The multiple virtual poles may be located on the one or more rotors and/or the one or more stators. In some implementations, the electric machine may be a brushless direct current (BLDC) motor and/or a brushless alternating current (BLAC) motor.

In this way, the system may be used to control the magnetic polarities of virtual poles and/or the armature configuration of the armature circuit to enable a multipolar electric machine (e.g., an electric machine having a dynamically configurable pole configuration). As a result, if operational requirements associated with the electric machine change (e.g., that affect one or more of a required flux, speed, torque, and/or power associated with the electric machine), then the system may dynamically change a pole number of the electric machine to meet the operational requirements (e.g., the system may control at least one of a flux, a torque, a speed, and/or a power associated with the electric machine without re-tooling the electric machine, without replacing the electric machine, and without adding a supplementary drive to the electric machine, among other examples).

Figure 1C:
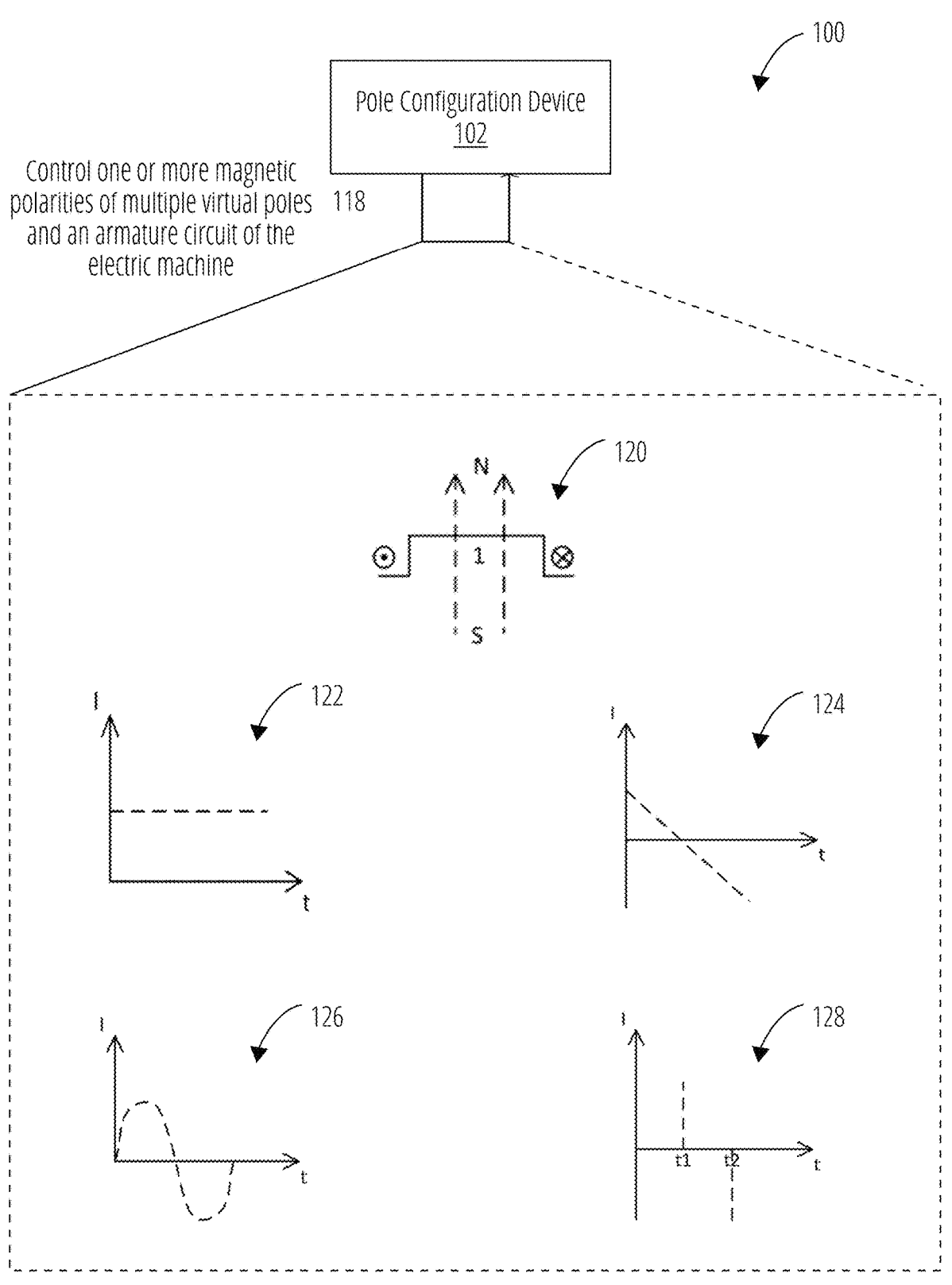
Figures 1D, 1E, 1F, 1G, 1H:
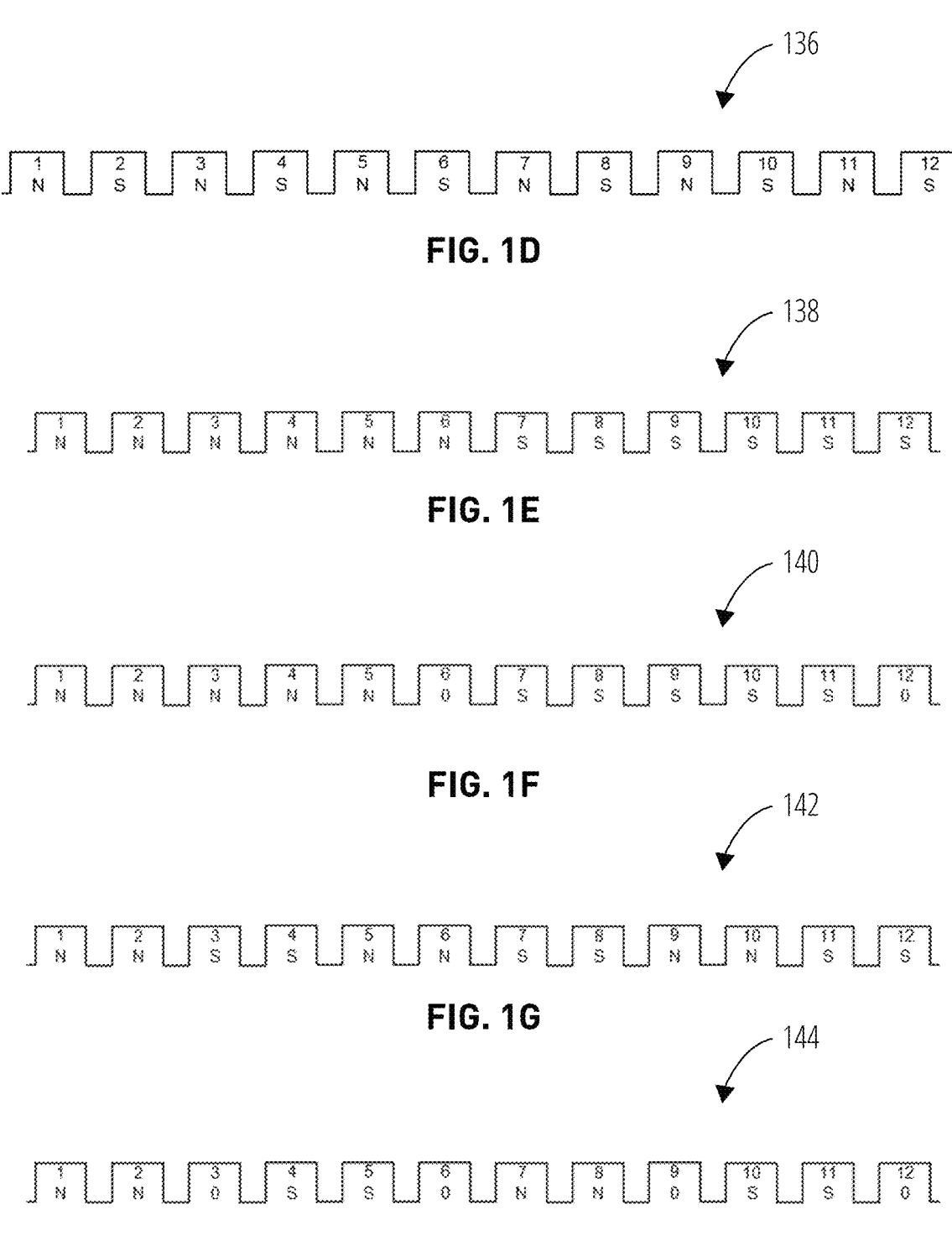
Figure 1R:

FIGS. 1A-1R are diagrams of an example 100 associated with dynamic pole configuration control. As shown in FIGS. 1A-1R, example 100 $a$ includes a pole configuration device 102, an electric machine 104, a rotor 106, a stator 108, a field circuit 110$a$, an armature circuit 110$b$, and a sensor 112. These devices are described in more detail in connection with FIGS. 2 and 3. Although the field circuit 110$a$ is shown and described as being associated with the rotor 106 (e.g., the field circuit 110$a$ is shown and described as being located or placed on the rotor 106 in connection with FIGS. 1A-1R), and the armature circuit 110$b$ is shown and described as being associated with the stator 108 (e.g., the armature circuit 110$b$ is shown and described as being located or placed on the stator 108 in connection with FIGS. 1A-1R), the field circuit 110$a$ and/or the armature circuit 110$b$ may be associated with any suitable component of the electric machine 104. For example, the field circuit 110$a$ may be associated with the stator 108 (e.g., the field circuit 110$a$ may be located or placed on the stator 108) and/or the armature circuit 110$b$ may be associated with the rotor 106 (e.g., the armature circuit 110$b$ may be located or placed on the rotor 106). Additionally, or alternatively, any suitable number of rotors, stators, field circuits, and/or armature circuits, among other examples, may be used by the electric machine 104.

In some implementations, the pole configuration device 102 may control a number, a magnetic strength, and/or a magnetic polarity of magnetic poles (e.g., included on the rotor 106 and/or the stator 108, as described in more detail elsewhere herein). For example, to control the number, magnetic strength, and/or the magnetic polarity of the magnetic poles, the pole configuration device 102 may control virtual poles (e.g., the field circuit 110$a$ may include multiple virtual poles). A "virtual pole" is a magnetic pole (e.g., an electromagnet located in the field circuit 110$a$ of the electric machine 104) having a controllable (e.g., adjustable) strength (e.g., magnetic field strength) and/or magnetic polarity. In other words, for example, a magnetic strength and/or a magnetic polarity of a virtual pole may be independently managed (e.g., by the pole configuration device 102), as described in more detail elsewhere herein.

In some implementations, the virtual poles may be controlled (e.g., via the pole configuration device 102) between a first magnetic polarity (e.g., a north magnetic polarity N), a second magnetic polarity (e.g., a south magnetic polarity S), and a zero magnetic polarity (e.g., a null magnetic polarity), as described in more detail elsewhere herein. As an example, the pole configuration device 102 may control the virtual poles using a current input (e.g., a controlled constant current input, a controlled linear current input, a controlled non-linear current input, and/or a controlled impulse current input).

In some implementations, the pole configuration device 102 may control (e.g., based on a desired pole configuration of the electric machine 104), magnetic polarities of multiple virtual poles and one or more armature configurations (e.g., one or more coil connection configurations, among other examples) of the armature circuit 110*b* to create a set (e.g., one or more sets) of effective poles. An "effective pole" is a magnetic pole including one or more virtual poles, of the multiple virtual poles, that have matching magnetic polarities (e.g., each virtual pole included in the set of effective poles has the same magnetic polarity) and that are associated with generating at least one of a flux, a speed, a torque, and/or a power related to the electric machine 104. Accordingly, for example, each effective pole may include one virtual pole or a group of virtual poles (e.g., a group of segmented virtual poles).

The one or more armature configurations of the armature circuit 110*b* may be configured to support the desired pole configuration of the electric machine 104. As an example, the armature circuit 110*b* may include coils that are connected according to a particular pattern and/or in association with a phase of the electric machine 104 (e.g., coils per phase may be serialized, parallelized and/or disconnected based on the desired pole configuration of the electric machine), as described in more detail elsewhere herein. In this way, the pole configuration device 102 may control the magnetic polarities of virtual poles and/or the armature configuration of the armature circuit 110*b* to enable a multipolar electric machine (e.g., an electric machine having a dynamically configurable pole configuration).

In some implementations, the pole configuration device 102 may be communicatively coupled to the virtual poles (e.g., may be communicatively coupled to each of the virtual poles). In this way, the pole configuration device 102 may selectively and independently control the virtual poles (e.g., by controlling a magnitude and/or a direction of current that flows through the virtual poles). Accordingly, for example, the pole configuration device 102 may adjust the magnetic polarity of the virtual poles (e.g., which may be electromagnets of one or more rotors and/or electromagnets of one or more stators of the electric machine 104) such that attractive and/or repulsive forces are affected by a difference in magnetic polarity between the virtual poles, as described in more detail elsewhere herein.

As further shown in FIG. 1A, and by reference number 114, the pole configuration device 102 may receive (e.g., from the sensor 112) input data associated with the electric machine 104 (e.g., physical, mechanical, electrical, and/or electromagnetic properties associated with the electric machine 104 and/or one or more components of the electric machine 104). For example, the input data may indicate a position of the rotor 106, a number of virtual poles, a number of effective poles, positions and/or placements of the virtual poles and/or the effective poles, current information (e.g., current flowing through the virtual poles, the effective poles, one or more components of the rotor 106, and/or one or more components of the stator 108), electromotive force (EMF) information (e.g., back EMF force information associated with one or more windings of the electric machine 104), control information (e.g., control signals and/or pulse width modulation (PWM) signals), voltage information, temperature information, speed information, torque information, power information, control mode information, fault detection information, and/or communication interface information, among other examples, related to the electric machine 104.

As shown in FIG. 1B, and by reference number 116, the pole configuration device 102 may determine a pole configuration associated with the electric machine 104 based on the input data. For example, the sensor 112 may send, and the pole configuration device 102 may receive, input data indicating operational requirements (e.g., operational characteristics) related to the electric machine 104 (e.g., a speed, a torque, and/or a power, among other examples, related to the electric machine 104). Accordingly, for example, the pole configuration (e.g., determined by the pole configuration device 102) may be based on the operational requirements.

As an example, if the operational requirements are associated with characteristics of a 2-pole motor, then the pole configuration device 102 may determine that the pole configuration is 2 poles. As another example, if the operational requirements are associated with characteristics of a 10-pole motor, then the pole configuration device 102 may determine that the pole configuration is 10 poles. In this way, the pole configuration device 102 may dynamically control the poles of the electric machine 104, which enables the electric machine 104 to efficiently operate using multiple different pole configurations (e.g., based on multiple and/or different operating parameters and/or requirements associated with the electric machine 104).

In some implementations, the pole configuration device 102 may control the virtual poles (e.g., located in the field circuit 110 and/or the stator 108) to cause the electric machine 104 to operate with a desired pole configuration. For example, and as shown in FIG. 1B, the field circuit includes n number of virtual poles that are used to control the pole configuration associated with the electric machine 104, as described in more detail elsewhere herein.

As shown in FIG. 1C, and by reference number 118, the pole configuration device 102 may control polarities (e.g., one or more polarities) of multiple virtual poles located in the field circuit 110*a*. In some implementations, the pole configuration device 102 may control the one or more polarities by controlling a direction of current flow in the one or more virtual poles. As an example, to control a magnetic polarity of a virtual pole, the pole configuration device 102 may cause current to flow through the virtual pole in a first direction resulting in the virtual pole generating a first magnetic polarity (e.g., a north magnetic polarity N) toward a flux output of the first virtual pole, may cause current to flow through the virtual pole in a second direction (e.g., that is opposite to the first direction) resulting in the virtual pole generating a second magnetic polarity (e.g., a south magnetic polarity S) toward the flux output of the virtual pole, and/or may refrain from causing current to flow through the virtual pole resulting in the virtual pole having a zero magnetic polarity (e.g., a null magnetic polarity). In this way, the pole configuration device 102 may control the magnetic polarities of the multiple virtual poles between a first magnetic polarity, a second magnetic polarity, and a zero magnetic polarity. Furthermore, the pole configuration device 102 may control a strength of magnetic fields of the virtual poles, as described in more detail elsewhere herein.

As shown in FIG. 1C, and by reference number 120, the pole configuration device 102 causes current (e.g., an instantaneous current) to flow through the virtual pole in a direction (e.g., at a positive magnitude) that causes the virtual pole to generate a north magnetic polarity N (e.g., at a strength based on the positive magnitude) toward the flux output of the virtual pole (e.g., where the dot shown in FIG. 1C represents the instantaneous current traveling in a direction that is out of the page and where the x shown in FIG. 1C represents the instantaneous current traveling in a direction that is into the page). Accordingly, a magnetic polarity of the virtual pole, and a strength associated with the magnetic polarity, may be changed (e.g., instantaneously changed) through current input control (e.g., by the pole configuration device 102), as described in more detail elsewhere herein.

As further shown in FIG. 1C, and by reference number 122, the current input (e.g., used by the pole configuration device 102 to control the virtual poles) is a constant current input. The pole configuration device 102 causes the current to flow through the virtual pole based on a constant positive current input over a time period (e.g., where the y-axis represents a magnitude of the current and the x axis represents time t). Based on the constant positive current input, the virtual pole generates the same magnetic polarity (e.g., which depends on a direction of the flow of current through the virtual pole), at the same magnitude, toward the flux output of the virtual pole during the time period. Although the constant current input shown and described in connection with FIG. 1C and reference number 122 is a constant positive current input, the constant current input may be any suitable constant current input, such as a constant negative current input.

As further shown in FIG. 1C, and by reference number 124, the current input (e.g., used by the pole configuration device 102 to control the virtual poles) is a linear current input. The pole configuration device 103 causes current to flow in the virtual pole based on a linear function current input over a time period (e.g., where the y-axis represents the magnitude of the current and the x axis represents the time t). Based on the linear function current input, the magnetic polarity of the virtual pole is controlled between a first magnetic polarity during a first time period, a zero magnetic polarity during a second time period, and a second magnetic polarity during a third time period. As an example, the virtual pole generates the first magnetic polarity having a strength that decreases over the first time period (e.g., based on the decreasing positive magnitude of the current), the virtual pole has a zero magnetic polarity during the second time period (e.g., based on a zero magnitude of the current), and the virtual pole generates the second magnetic polarity having a strength that decreases over the third time period (e.g., based on the negative magnitude of the current). In other words, the virtual pole will have the first magnetic polarity (based on the positive current input) with a reduced intensity over time, the zero magnetic polarity (e.g., based on the zero magnitude of the current input), and the second magnetic polarity (e.g., based on the negative current input) that increases over time in the negative direction.

As further shown in FIG. 1C, and by reference number 126, the current input (e.g., used by the pole configuration device 102 to control the virtual poles) is a non-linear current input. The pole configuration device 102 causes current to flow in the virtual pole based on a non-linear function current input over a time period (e.g., where the y-axis represents the magnitude of the current and the x axis represents the time t). Based on the non-linear function current input, the magnetic polarity of the virtual pole is controlled between a first magnetic polarity during a first time period, a zero magnetic polarity during a second time period, and a second magnetic polarity during a third time period. As an example, the virtual pole generates the first magnetic polarity having a strength that varies over the first time (e.g., based on the varying positive magnitude of the current), the virtual pole has a zero magnetic polarity at during the second time period (e.g., based on a zero magnitude of the current), and the virtual pole generates the second magnetic polarity having a strength that varies over the third time period (e.g., based on the varying negative magnitude of the current). In other words, the virtual pole will have the first magnetic polarity (based on the positive current input) with a varying intensity over time, a zero magnetic polarity (e.g., based on the zero magnitude of the current input), and the second magnetic polarity (e.g., based on the negative current input) with a varying intensity over time.

As further shown in FIG. 1C, and by reference number 128, the current input (e.g., used by the pole configuration device 102 to control the virtual poles) is an impulse current input. The pole configuration device 102 causes current to flow in the virtual pole based on an impulse function current input at a first time period t1 and a second time period t2 (e.g., where the y-axis represents the magnitude of the current and the x axis represents the time t). Based on the impulse function current input, the magnetic polarity of the virtual pole is controlled between a first magnetic polarity during the first time period t1 and a second magnetic polarity during the second time period t2. In other words, the virtual pole will have the first magnetic polarity (based on the positive current input) with an intensity based on magnitude of the current at the first time t1, a zero magnetic polarity (e.g., based on the zero magnitude of the current input), and the second magnetic polarity (e.g., based on the negative current input) with an intensity based on the magnitude of the current at the second time t2.

As shown in FIG. 1D, and by reference number 136, the pole configuration device 102 controls the magnetic polarities of the virtual poles (e.g., located in the field circuit 110a) to create 12 effective poles (e.g., of the electric machine 104). As an example, the pole configuration device 102 creates a first effective pole (e.g., which includes virtual pole 1 having a north magnetic polarity N), a second effective pole (e.g., which includes virtual pole 2 having a south magnetic polarity S), a third effective pole (e.g., which includes virtual pole 3 having a north magnetic polarity N), a fourth effective pole (e.g., which includes virtual pole 4 having a south magnetic polarity S), a fifth effective pole (e.g., which includes virtual pole 5 having a north magnetic polarity N), a sixth effective pole (e.g., which includes virtual pole 6 having a south magnetic polarity S), a seventh effective pole (e.g., which includes virtual pole 7 having a north magnetic polarity N), an eighth effective pole (e.g., which includes virtual pole 8 having a south magnetic polarity S), a ninth effective pole (e.g., which includes virtual pole 9 having a north magnetic polarity N), a tenth effective pole (e.g., which includes virtual pole 10 having a south magnetic polarity S), an eleventh effective pole (e.g., which includes virtual pole 11 having a north magnetic polarity N), and a twelfth effective pole (e.g., which includes virtual pole 12 having a south magnetic polarity S).

As shown in FIG. 1E, and by reference number 138, the pole configuration device 102 controls the magnetic polarities of the virtual poles (e.g., located in the field circuit 110a) to create a pole configuration having 2 effective poles. As an example, the pole configuration device 102 creates a first set of effective poles (e.g., which includes virtual poles 1-6 having a north magnetic polarity N) and a second set of effective poles (e.g., which includes virtual poles 7-12 having a south magnetic polarity S).

As shown in FIG. 1F, and by reference number 140, the pole configuration device 102 controls the magnetic polarities of the virtual poles (e.g., located in the field circuit 110*a*) to create a pole configuration having 2 effective poles. As an example, the pole configuration device 102 creates a first set of effective poles (e.g., which includes virtual poles 1-5 having a north magnetic polarity N) and a second set of effective poles (e.g., which includes virtual poles 7-11 having a south magnetic polarity S). Additionally, the pole configuration device 102 causes virtual poles 6 and 12 to have a zero magnetic polarity (e.g., by refraining from causing current to flow in virtual poles 6 and 12).

As shown in FIG. 1G, and by reference number 142 the pole configuration device 102 controls the magnetic polarities of the virtual poles (e.g., located in the field circuit 110*a*) to create a pole configuration having 6 effective poles. As an example, the pole configuration device 102 creates a first set of effective poles (e.g., which includes virtual poles 1-2 having a north magnetic polarity N), a second set of effective poles (e.g., which includes virtual poles 3-4 having a south magnetic polarity S), a third set of effective poles (e.g., which includes virtual poles 5-6 having a north magnetic polarity N), a fourth set of effective poles (e.g., which includes virtual poles 7-8 having a south magnetic polarity S), a fifth set of effective poles (e.g., which includes virtual poles 9-10 having a north magnetic polarity N), and a sixth set of effective poles (e.g., which includes virtual poles 11-12 having a south magnetic polarity S).

As shown in FIG. 1H, and by reference number 144, the pole configuration device 102 controls the magnetic polarities of the virtual poles (e.g., located in the field circuit 110*a*) to create a pole configuration having 4 effective poles. As an example, the pole configuration device 102 creates a first set of effective poles (e.g., which includes virtual poles 1-2 having a north magnetic polarity N), a second set of effective poles (e.g., which includes virtual poles 4-5 having a south magnetic polarity S), a third set of effective poles (e.g., which includes virtual poles 7-8 having a north magnetic polarity N), and a fourth set of effective poles (e.g., which includes virtual poles 10-11 having a south magnetic polarity S). Additionally, the pole configuration device 102 causes virtual poles 3, 6, 9, and 12 to have a zero magnetic polarity.

In some implementations, the armature circuit 110*b* may include windings (e.g., stator windings) that are located or placed on the stator 108. For example, the armature circuit 110*b* may include 3 sets of stator windings that are located or placed on a three-phase stator. As an example, the stator 108 may include a first set of stator windings for a first phase (e.g., phase A), a second set of stator windings for a second phase (e.g., phase B), and a third set of stator windings for a third phase (e.g., phase C). The stator windings may be operatively coupled to the stator 108 via coil connections.

In some implementations, the coil connections may be configurable based on the pole configuration (e.g., based on the number of effective poles of the field circuit 110*a*) of the electric machine 104. Although the armature circuit 110*b* is described herein as including stator windings that are located or placed on a three-phase stator, the armature circuit 110*b* may be any suitable armature circuit having any suitable configuration that is located or placed on any suitable number of components of the electric machine 104. Accordingly, the field circuit 110*a* and/or the armature circuit 110*b* may be included in the electric machine 104 to facilitate one or more operating parameters and/or requirements associated with the electric machine 104.

In some implementations, the coils (e.g., of the armature circuit 110*b*) may be wrapped around stator slots (or rotor slots). As an example, each stator slot (e.g., each stator tooth) may include two coil sides and one coil may be wrapped around each stator tooth. FIG. 1I illustrates an example coil configuration 146 (e.g., an example armature circuit or armature configuration) having a two-layer (or double layer) concentrated winding that may be included in the electric machine 104. The coil configuration 146 includes 18 stator slots (e.g., having 18 stator teeth) and 18 coils. Each coil (e.g., shown as coil 1-coil 18 in FIG. 1I) of the coil configuration 146 is wrapped around a stator tooth (e.g., where the dot shown in FIG. 1I represents a first direction of a coil winding and where the x shown in FIG. 1I represents a second direction of the coil winding). The coil configuration 146 is a three-phase coil configuration, and, therefore, the coil configuration 146 includes 6 coils per phase. As an example, the coil configuration 146 may be used in association with different numbers of effective poles, as described in more detail elsewhere herein.

FIG. 1J illustrates an example stator 148 (e.g., which may be included in the electric machine 104) including 18 stator slots (e.g., a first stator slot 150, of the 18 stator slots, is shown in FIG. 1J), 40 virtual poles (e.g., a first virtual pole 152, of the 40 virtual poles, is shown in FIG. 1J), and 8 effective poles (e.g., shown as a first effective pole 154, a second effective pole 156, a third effective pole 158, a fourth effective pole 160, a fifth effective pole 162, a sixth effective pole 164, a seventh effective pole 166 and an eighth effective pole 168 in FIG. 1J). As an example, to create the 8 effective poles, the pole configuration device 102 may control (e.g., based on a desired pole configuration of 8 poles that is based on input data received by the pole configuration device 102) polarities of the 40 virtual poles to create the 8 effective poles.

As shown in FIG. 1J, the first effective pole 154 includes 5 virtual poles of a first magnetic polarity (e.g., a north magnetic polarity N), the second effective pole 156 includes 5 virtual poles of a second magnetic polarity (e.g., a south magnetic polarity S), the third effective pole 158 includes 5 virtual poles of the first magnetic polarity (e.g., the north magnetic polarity), the fourth effective pole 160 includes 5 virtual poles of the second magnetic polarity (e.g., the south magnetic polarity S), the fifth effective pole 162 includes 5 virtual poles of the first magnetic polarity (e.g., the north magnetic polarity N), the sixth effective pole 164 includes 5 virtual poles of the second magnetic polarity (e.g., the south magnetic polarity S), the seventh effective pole 166 includes 5 virtual poles of the first magnetic polarity (e.g., the north magnetic polarity N), and the eighth effective pole 168 includes 5 virtual poles of the second magnetic polarity (e.g., the south magnetic polarity S). Accordingly, the virtual poles of each effective pole may be associated with generating at least one of a flux, a speed, a torque, and/or a power related to the electric machine 104.

FIG. 1K illustrates an example coil configuration 170 that may be used with the stator 148 of FIG. 1J. The coil configuration 170 includes 6 coils per phase (e.g., 6 coils for phase A, 6 coils for phase B, and 6 coils for phase C). The plus and minus signs shown in FIG. 1K represent an example terminal nomenclature for the coil connections of the coil configuration 170 of FIG. 1J. In some implementations, the coils per phase may be serialized, parallelized and/or disconnected based on the desired pole configuration.

FIG. 1L illustrates an example serialization 172 of the coils for phase A (e.g., shown as coils 2, 5, 9, 11, and 13 in FIG. 1L) of the coil configuration 170 of FIG. 1K. FIG. 1M illustrates an example parallelization 174 of the coils for phase A (e.g., shown as coils 2, 4, 9, 11, 13, and 18) of the coil configuration 170 of FIG. 1K. Although a coil configuration and coil connections are shown and described in connection with FIGS. 1J-1M, any suitable coil configuration and/or coil connections may be utilized, such as parallelization of all coil terminals in groups of one coil or two serialized coils and/or disconnection of one or more coils, among other examples. In this way, the electric machine 104 may use a flexible coil configuration that may be based on the number of effective poles in the field circuit 110a of the electric machine 104 (e.g., which may be disposed on the rotor 106 or disposed on the stator 108).

FIG. 1N illustrates an example stator 176 (e.g., which may be included in the electric machine 104) including 18 stator slots (e.g., a first stator slot 150, of the 18 stator slots, is shown in FIG. 1N), 40 virtual poles (e.g., a first virtual pole 152, of the 40 virtual poles, is shown in FIG. 1N), and 10 effective poles (e.g., shown as a first effective pole 154, a second effective pole 156, a third effective pole 158, a fourth effective pole 160, a fifth effective pole 162, a sixth effective pole 164, a seventh effective pole 166, an eighth effective pole 168, a ninth effective pole 178, and a tenth effective pole 180 in FIG. 1N). As an example, to create the 10 effective poles, the pole configuration device 102 may control (e.g., based on a desired pole configuration of 10 poles that is based on input data received by the pole configuration device 102) polarities of the 40 virtual poles to create the 10 effective poles.

As shown in FIG. 1N, the first effective pole 154 includes 4 virtual poles of a first magnetic polarity (e.g., a north magnetic polarity N), the second effective pole 156 includes 4 virtual poles of a second magnetic polarity (e.g., a south magnetic polarity S), the third effective pole 158 includes 4 virtual poles of the first magnetic polarity (e.g., the north magnetic polarity N), the fourth effective pole 160 includes 4 virtual poles of the second magnetic polarity (e.g., the south magnetic polarity S), the fifth effective pole 162 includes 4 virtual poles of the first magnetic polarity (e.g., the north magnetic polarity N), the sixth effective pole 164 includes 4 virtual poles of the second magnetic polarity (e.g., the south magnetic polarity S), the seventh effective pole 166 includes 4 virtual poles of the first magnetic polarity (e.g., the north magnetic polarity N), the eighth effective pole 168 includes 4 virtual poles of the second magnetic polarity (e.g., the south magnetic polarity S), the ninth effective pole 178 includes 4 virtual poles of the first magnetic polarity (e.g., the north magnetic polarity N), and the tenth effective pole 180 includes 4 virtual poles of the second magnetic polarity (e.g., the south magnetic polarity S). Accordingly, the virtual poles of each effective pole may be associated with generating at least one of a flux, a speed, a torque, and/or a power related to the electric machine 104.

FIG. 1O illustrates an example coil configuration 182 that may be used with the stator 176 of FIG. 1N. The coil configuration 182 includes 6 coils per phase (e.g., 6 coils for phase A, 6 coils for phase B, and 6 coils for phase C). The plus and minus signs shown in FIG. 1O represent an example terminal nomenclature for the coil connections of the coil configuration 182 of FIG. 1O. In some implementations, the coils per phase may be serialized, parallelized and/or disconnected based on the desired pole configuration.

FIG. 1P illustrates an example serialization 184 of the coils for phase A (e.g., shown as coils 2, 7, 9, 11, 16, and 18 in FIG. 1P) of the coil configuration 182 of FIG. 1N. FIG. 1Q illustrates an example parallelization 186 of the coils for phase A (e.g., shown as coils 2, 7, 9, 11, 16, and 18) of the coil configuration 182 of FIG. 1O. Although a coil configuration and coil connections are shown and described in connection with FIGS. 1N-1Q, any suitable coil configuration and/or coil connections may be utilized, such as parallelization of all coil terminals in groups of one coil or two serialized coils and/or disconnection of one or more coils, among other examples. In this way, the electric machine 104 may use a flexible coil configuration that may be based on the number of effective poles in the field circuit 110a of the electric machine 104 (e.g., which may be disposed on the rotor 106 and/or the stator 108).

FIG. 1R illustrates an example coil configuration 188 that may be used with a stator having 12 effective poles. The coil configuration 182 includes 6 coils per phase (e.g., 6 coils for phase A, 6 coils for phase B, and 6 coils for phase C). The plus and minus signs shown in FIG. 1R represent an example terminal nomenclature for the coil connections of the coil configuration 188 of FIG. 1R. Accordingly, in some implementations, the pole configuration device 102 may control polarities of different combinations of virtual poles to create different numbers of effective poles (e.g., 12 effective poles, 14 effective poles, 16 effective poles, and/or 40 effective poles, among other examples).

For example, the pole configuration device 102 may control polarities of adjacent groups of consecutive virtual poles. For example, to create 12 effective poles, the pole configuration device 102 may control 12 adjacent groups of consecutive virtual poles, having alternating polarities, in a 4-3-3-4-3-3-4-3-3-4-3-3 pattern (e.g., four consecutive virtual poles of a first magnetic polarity adjacent to three consecutive virtual poles of a second magnetic polarity adjacent to three consecutive poles of the first magnetic polarity adjacent to four consecutive virtual poles of the second magnetic polarity adjacent to three consecutive virtual poles of the first magnetic polarity adjacent to three consecutive virtual poles of the second magnetic polarity adjacent to four consecutive virtual poles of a first magnetic polarity adjacent to three consecutive virtual poles of a second magnetic polarity adjacent to three consecutive poles of the first magnetic polarity adjacent to four consecutive virtual poles of the second magnetic polarity adjacent to three consecutive virtual poles of the first magnetic polarity adjacent to three consecutive virtual poles of the second magnetic polarity). In this case, the coils for phase A, with respect to the numbering of the coil configuration 188 of FIG. 1R, are coils 2, 5, 8, 11, 14, and 17.

As another example to create 14 effective poles, the pole configuration device 102 may control 14 adjacent groups of consecutive virtual poles, having alternating magnetic polarities, in a 3-3-3-3-3-3-2-3-3-3-3-3-3-2, as described in more detail elsewhere herein. In this case, the coils for phase A, with respect to the numbering of the coil configuration 188 of FIG. 1R, are coils 1, 5, 6, 10, 14, and 15. Accordingly, the pole configuration device 102 may control polarities to create up to 40 effective poles (e.g., based on a 1-1-1-1-1-1-1-1-1-1-1-1-1-1-1-1-1-1-1-1-1-1-1-1-1-1.1-1-1-1-1-1-1-1-1-1 pattern). In this way, the pole configuration device 102 may control the magnetic polarities of virtual poles and/or the armature configuration of the armature circuit 110b to enable a multipolar electric machine (e.g., an electric machine having a dynamically configurable pole configuration).

As indicated above, FIGS. 1A-1R are provided as an example. Other examples may differ from what is described with regard to FIGS. 1A-1R.

FIG. 2 is an example environment 200 in which systems and/or methods described herein may be implemented. As shown in FIG. 2, environment 200 includes a pole configuration device 102, an electric machine 104, a rotor 106, a stator 108, a field circuit 110a, an armature circuit 110b, a sensor 112, and a network 202. Devices of environment 200 may interconnect via wired connections, wireless connections, or a combination of wired or wireless connections. As shown in FIG. 2, the field circuit 110a may be included in the rotor 106 or the stator 108 and the armature circuit 110b may be included in the rotor 106 or stator. As an example, if the field circuit 110a is located or placed on the rotor 106, then the armature circuit 110b may be located or placed on the stator 108. As another example, if the field circuit 110a is located or placed on the stator 108, then the armature circuit 110b may be located or placed on the rotor 106.

The pole configuration device 102 may include one or more devices capable of receiving, generating, storing, processing, providing, and/or routing information associated with dynamic pole configuration control, as described elsewhere herein. The pole configuration device 102 may include a communication device and/or a computing device. For example, the pole configuration device 102 may include a server, such as an application server, a client server, a web server, a database server, a host server, a proxy server, a virtual server (e.g., executing on computing hardware), or a server in a cloud computing system. In some implementations, the pole configuration device 102 may include computing hardware used in a cloud computing environment.

The electric machine 104 may include one or more electric machines capable of converting electrical energy into mechanical energy (e.g., one or more electric motors) and/or converting mechanical energy into electrical energy (e.g., one or more generators). For example, the electric machine 104 may include one or more brushless direct current (BLDC) electric motors, one or more synchronous motors, one or more permanent magnet (PM) motors, one or more linear motors, one or more stepped motors, one or more alternating current (AC) motors, one or more universal motors, one or more shaded pole motors, and/or one or more hysteresis motors, among other examples.

The rotor 106 may include one or more devices capable of generating mechanical motion and/or electrical output (e.g., via rotation) in association with dynamic pole configuration control. As an example, the rotor 106 may include one or more squirrel cage rotors (e.g., associated with induction motors), one or more wound rotors (e.g., one or more slip ring rotors), one or more permanent magnet rotors (e.g., associated with BLDC/BLAC motors), and/or one or more field winding rotors (e.g., associated with synchronous motors), among other examples. In some implementations, the field circuit may be located in the rotor 106.

The stator 108 may include one or more devices capable of providing a magnetic field that interacts with one or more rotors in association with dynamic pole configuration control, as described elsewhere herein. As an example, stator 108 may include one or more three-phase stators (e.g., associated with three-phase electric machines), one or more synchronous stators (e.g., associated with synchronous electric machines), one or more BLDC/BLAC stators (e.g., associated with BLDC/BLAC machines), among other examples. In some implementations, the armature circuit may be located in the stator 108 (or may be located in the rotor 106 and the field circuit 110a may be located in the stator 108).

The field circuit 110a may include one or more devices capable of creating a magnetic field (e.g., within the electric machine 104) associated with dynamic pole configuration control, as described elsewhere herein. For example, the field circuit 110a may include coils (e.g., field windings) of wire wound around a magnetic core (or may include permanent magnets). The coils may be capable of generating a magnetic field when current flows through the coils. The magnetic field produced by the field circuit interacts with an armature winding to generate the electrical or mechanical output, as described elsewhere herein. The field circuit may be located on one or more rotors and/or one or more stators.

The armature circuit 110b may include one or more devices capable of creating a magnetic field (e.g., within the electric machine 104) associated with dynamic pole configuration control, as described in more detail elsewhere herein.

The sensor 112 may include one or more wired or wireless devices capable of receiving, generating, storing, transmitting, processing, detecting, and/or providing information associated with dynamic pole configuration control, as described elsewhere herein. For example, the sensor 112 may include a Hall Effect sensor, an encoder sensor (e.g., an incremental encoder and/or an absolute encoder), a resolver sensor, a tachometer, a temperature sensor (e.g., a thermocouple and/or a thermistor), a current sensor (e.g., a current transformer and/or a Hall Effect current sensor), a voltage sensor, a pressure sensor, a position sensor, a vibration sensor, a proximity sensor, an accelerometer, a load cell, a gyroscope, a power factor correction (PFC) sensor, a speed governor, a torque sensor, a capacitive sensor, a timing device, an active sensor (e.g., a sensor that requires an external power signal), a passive sensor (e.g., a sensor that does not require an external power signal), a magnetic sensor, an electromagnetic sensor, an analog sensor, and/or a digital sensor, among other examples. The sensor 112 may sense or detect a condition or information and transmit, using a wired or wireless communication interface, an indication of the detected condition or information to other devices in the environment 200.

The network 202 may include one or more wired and/or wireless networks. For example, the network 202 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 202 enables communication among the devices of environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
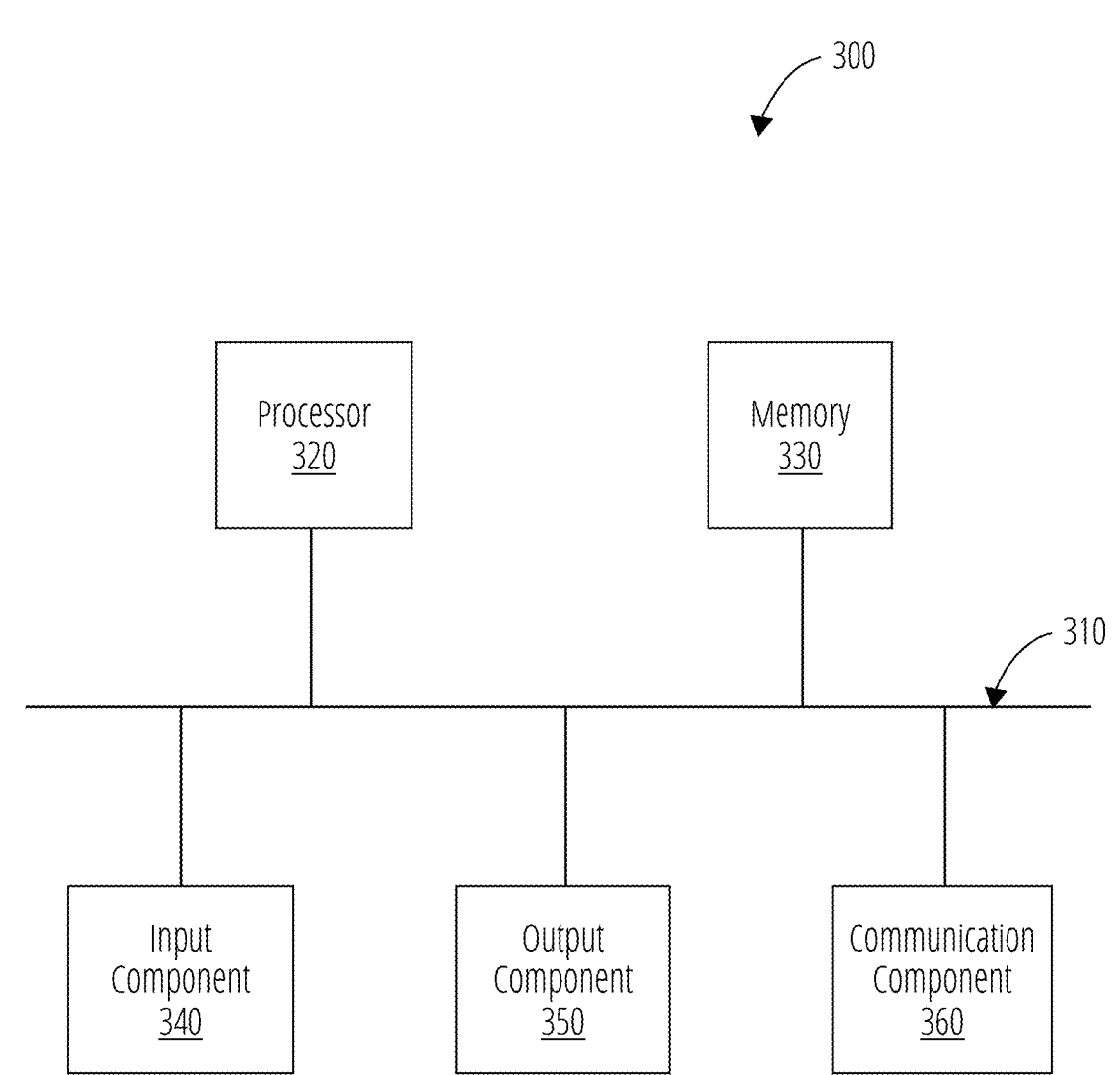
FIG. 3 is a diagram of example components of a device associated with systems and methods for dynamically controlling pole configurations of an electric machine, in accordance with some embodiments of the present disclosure.

FIG. 3 is a diagram of example components of a device 300 associated with dynamic pole configuration control. The device 300 may correspond to the pole configuration device 102, the electric machine 104, the rotor 106, the stator 108, the field circuit 110a, the armature circuit 110b, and/or the sensor 112. In some implementations, the pole configuration device 102, the electric machine 104, the rotor 106, the stator 108, the field circuit 110a, the armature circuit 110b, and/or the sensor 112 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
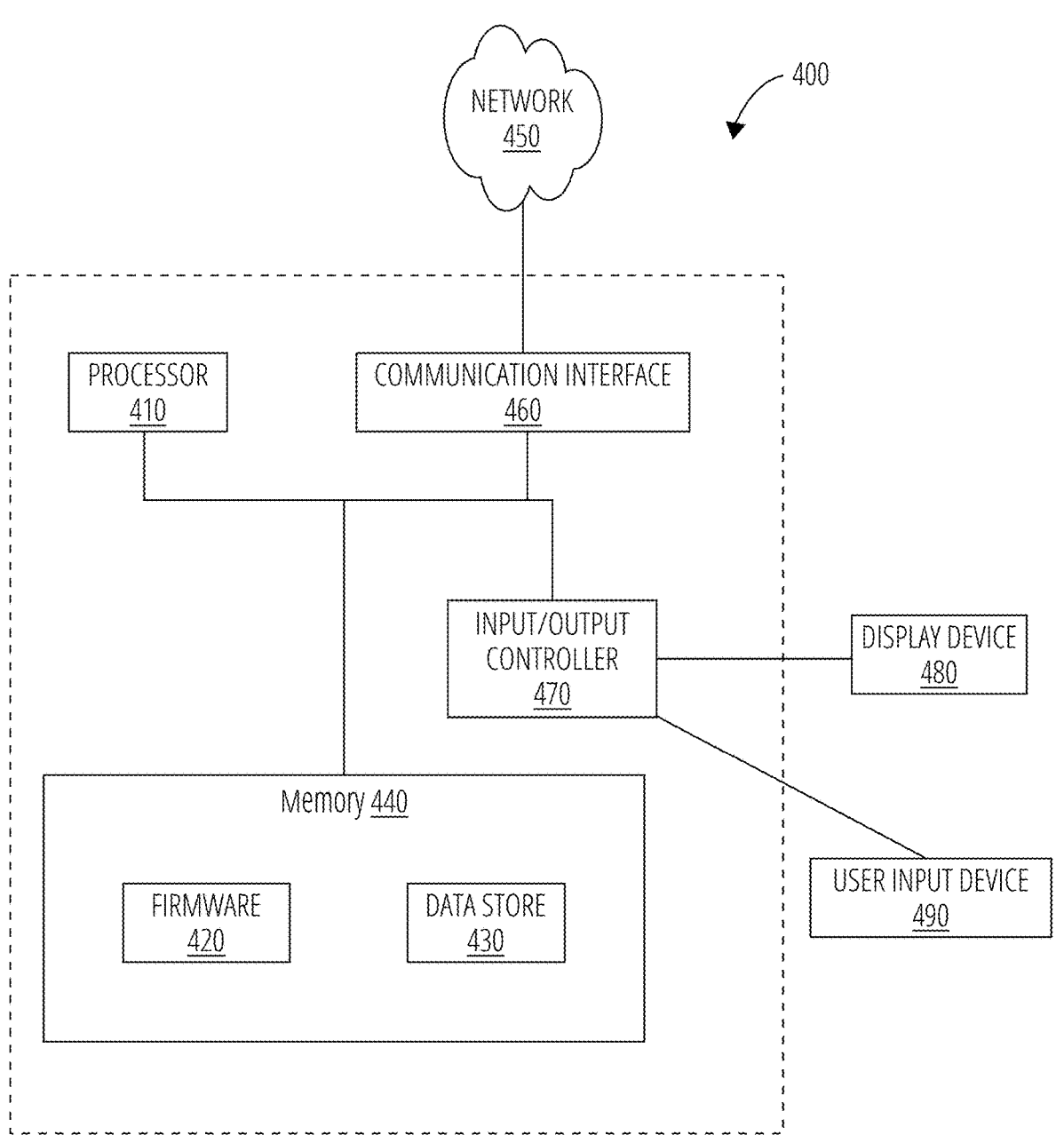
FIG. 4 is a diagram of an example computing-based device associated with systems and methods for dynamically controlling pole configurations of an electric machine, in accordance with some embodiments of the present disclosure.

FIG. 4 illustrates various components of an exemplary computing-based device 400 which may be implemented as any form of a computing and/or electronic device, and in which embodiments of a controller may be implemented. Computing-based device 400 comprises a processor 410, firmware 420, a data store 430, a memory 440, a network 450, a communication interface 460, an input/output controller 470, a display device 480, and a user input device 490. The processor 410 may be one or more microprocessors, controllers, and/or or any other suitable type of processors for processing computer executable instructions to control the operation of the computing-based device 400. In some implementations (e.g., where a system on a chip architecture is used), the processor 410 may include one or more fixed function blocks (also referred to as accelerators) which implement a part of controlling one or more embodiments discussed above. Firmware 420 (and/or or an operating system and/or or any other suitable platform software) may be provided at the computing-based device 400. Data store 430 is available to store sensor data, parameters, logging regimes, and other data.

The computer executable instructions may be provided using any computer-readable media that is accessible by computing based device 400. Computer-readable media may include, for example, computer storage media such as memory 440 and communications media. Computer storage media, such as memory 440, includes volatile and non-volatile, removable, and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but signals per se, propagated or otherwise, are not examples of computer storage media. Although the computer storage media (memory 440) is shown within the computing-based device 400 it will be appreciated that the storage may be distributed or located remotely and accessed via the network 450 or other communication link (e.g., using communication interface 460).

The input/output controller 470 may be arranged to output display information to the display device 480 which may be separate from or integral to the computing-based device 400. The display information may provide a graphical user interface. The input/output controller 470 may also be arranged to receive and process input from one or more devices, such as the user input device 490 (e.g., a mouse, keyboard, camera, microphone, or other sensor).

In some implementations, the user input device 490 may detect voice input, user gestures or other user actions and may provide a natural user interface. This user input may be used to change parameter settings, view logged data, access control data from the device such as battery status and/or for other control of the computing-based device 400. In some embodiments, the display device 480 may also act as the user input device 490 (e.g., if the display device 480 is a touch sensitive display device). The input/output controller 470 may also output data to devices other than the display device (e.g., a locally connected printing device). The input/output controller 470 may also connect to various sensors (e.g., as described in more detail elsewhere herein) and/or may connect to the various sensors directly and/or through the network 450.

The input/output controller 470, the display device 480, and/or the user input device 490 (e.g., optionally) may comprise natural user interface (NUI) technology which enables a user to interact with the computing-based device in a natural manner, free from artificial constraints imposed by input devices such as mice, keyboards, and/or remote controls, among other examples. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and/or machine intelligence. Other examples of NUI technology that may be used include intention and goal understanding systems, motion gesture detection systems using depth cameras (such as stereoscopic camera systems, infrared camera systems, RGB camera systems, and/or combinations of these, among other examples), motion gesture detection using accelerometers/gyroscopes, facial recognition, 3D displays, head, eye and gaze tracking, immersive augmented reality and virtual reality systems and/or technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants, and many other devices.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

FIGS. 5-8 are flowcharts associated with systems and methods as described in more detail elsewhere herein. In some implementations, one or more process and/or method blocks of FIGS. 5-8 may be performed by a pole configuration device (e.g., the pole configuration device 102). In some implementations, one or more process and/or method blocks of FIGS. 5-8 may be performed by another device or a group of devices separate from or including the pole configuration device, such as an electric machine (e.g., the electric machine 104), a field circuit (e.g., the field circuit), a rotor (e.g., the rotor 106), a stator (e.g., the stator 108), and/or a sensor (e.g., the sensor 112). Additionally, or alternatively, one or more process and/or method blocks of FIGS. 5-8 may be performed by one or more components of the device 300 (e.g., the processor 320, the memory 330, the input component 340, the output component 350, and/or the communication component 360) and/or one or more components of the computing-based device 400 (e.g., the processor 410, the firmware 420, the data store 430, the memory 440, the network 450, the communication interface 460, the input/output controller 470, the display device 480, and the user input device 490).

FIG. 5 is a flowchart of an example process 500 associated with dynamically controlling pole configurations of an electric machine. As shown in FIG. 5, process 500 may include receiving input data indicating information associated with the electric machine (block 510). For example, the pole configuration device may receive input data indicating information associated with the electric machine, as described above.

As further shown in FIG. 5, process 500 may include determining, based on the input data, one or more desired pole numbers of the electric machine (block 520). For example, the pole configuration device may determine, based on the input data, one or more desired pole numbers of the electric machine, as described above. In some implementations, the pole configuration device may determine, based on the input data, at least one of a desired speed, a desired torque, or a desired power associated with the electric machine. The desired pole number may be based on the at least one of the desired speed, the desired torque, or the desired power.

As further shown in FIG. 5, process 500 may include setting, based on the one or more desired pole numbers, magnetic polarities of multiple virtual poles, included in a field circuit of the machine and an armature circuit of the electric machine, to create one or more effective poles that are associated with generating at least one of a flux, a speed, a torque, and/or or a power related to the electric machine (block 530). For example, the pole configuration device may set, based on the one or more desired pole numbers, magnetic polarities of multiple virtual poles, included in a field circuit of the machine and an armature circuit of the electric machine, to create one or more effective poles that are associated with generating at least one of a flux, a speed, a torque, and/or or a power related to the electric machine, as described above. In some implementations, the pole configuration device may control the magnetic polarities via at least one of a constant current input, a linear current input, a non-linear current input, and/or an impulse current input.

In some implementations, process 500 may include receiving second input data. The pole configurations device may determine, based on the second input data, an adjusted desired pole number of the electric machine. The pole configuration device may adjust, based on the adjusted desired pole number, the magnetic polarities of the multiple virtual poles to create one or more adjusted effective poles. The one or more adjusted effective poles may include a subset of virtual poles, of the multiple virtual poles, that are associated with generating at least one of an adjusted speed, an adjusted torque, or an adjusted power associated with the electrical machine. In some implementations, the desired pole number may be based on an operating parameter associated with the electric machine. In some implementations, the pole configuration device may be used in a brushless direct current (BLDC/BLAC) motor.

Figure 6:
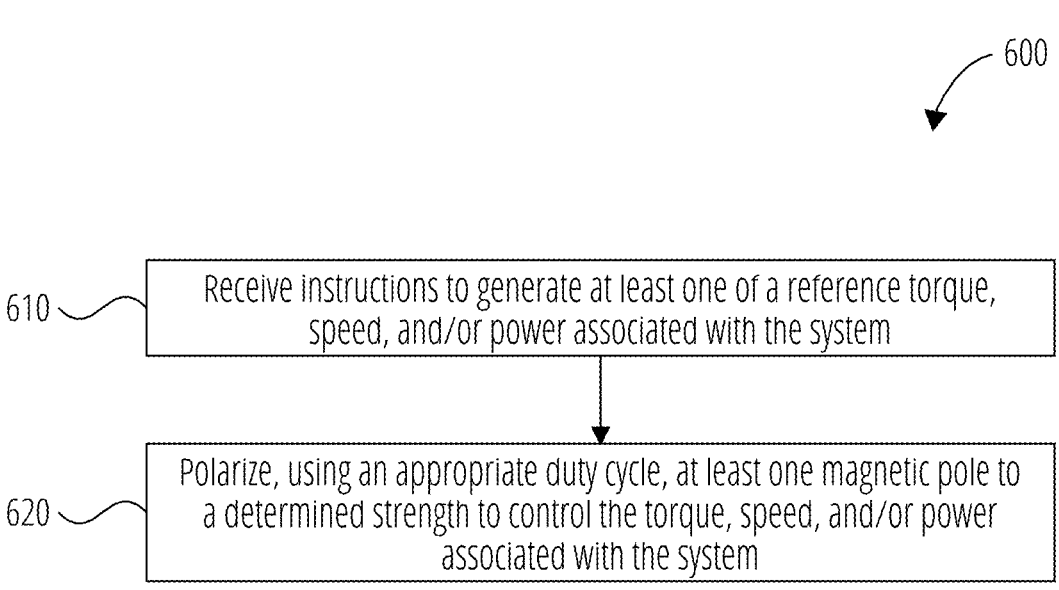
FIG. 6 is a flowchart of an example method associated with controlling torque, speed, or power in a system for generating mechanical and/or electrical energy, in accordance with some embodiments of the present disclosure.

FIG. 6 is a flowchart of an example method 600 associated with controlling a torque, a speed, and/or a power in a system for generating mechanical and/or electrical energy, in accordance with some embodiments of the present disclosure. As shown in FIG. 6, method 600 may include receiving instructions to generate a reference (e.g., required) torque, speed, and/or power associated with the system (block 610). For example, the pole configuration device may receive instructions to generate a required torque, speed, and/or power associated with the system, as described above.

As further shown in FIG. 6, the method 600 may include polarizing, using an appropriate duty cycle, at least one magnetic pole to a determined strength to control the reference torque, speed, and/or power associated with the system (block 620). For example, the pole configuration device may polarize, using an appropriate duty cycle, at least one magnetic pole to a determined strength to control the torque, speed, and/or power associated with the system, as described above.

Figure 7:
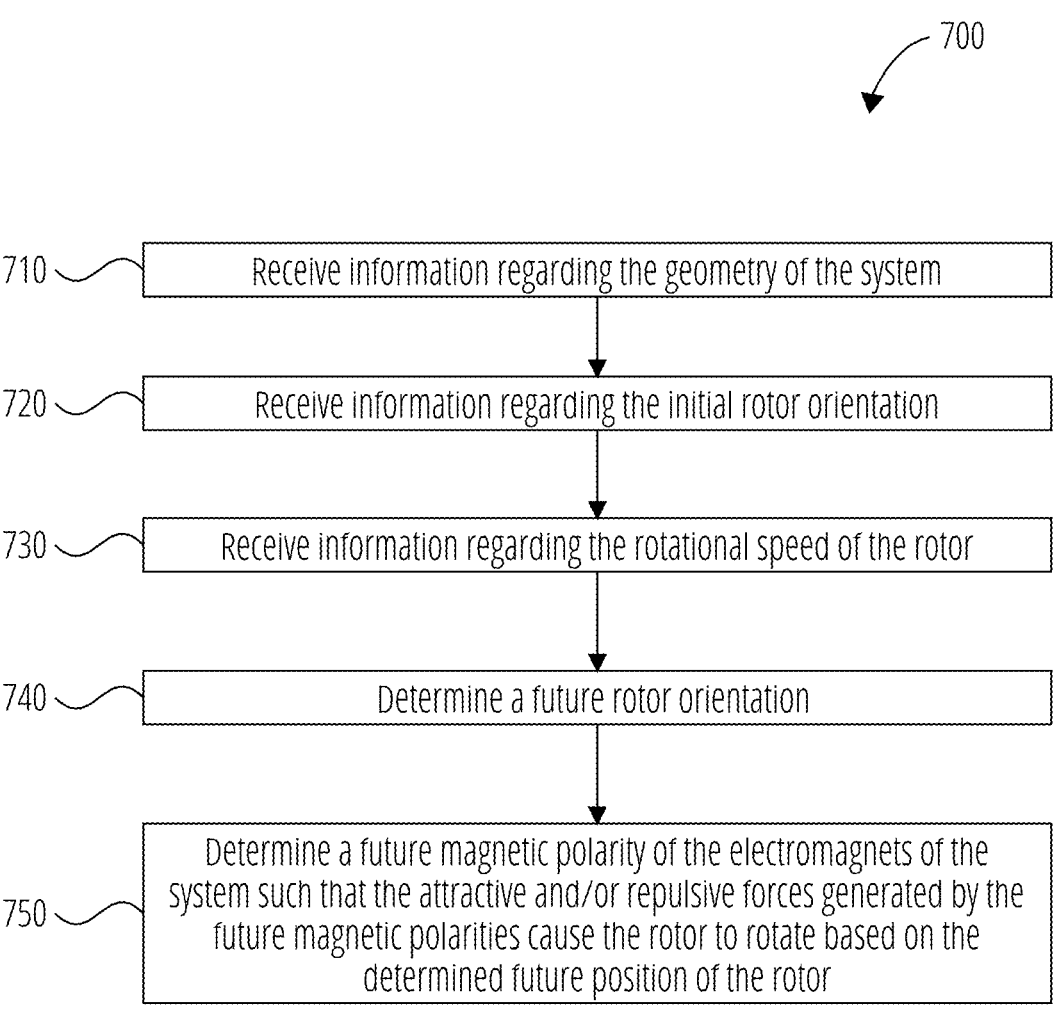
FIG. 7 is a flowchart of an example method associated with controlling a polarity of a plurality of electromagnets based on a timing of a rotation of a rotor of a system for generating mechanical and/or electrical energy, in accordance with some embodiments of the present disclosure.

FIG. 7 is a flowchart of an example method associated with controlling a polarity of a plurality of electromagnets based on a timing of a rotation of a rotor of a system for generating mechanical and/or electrical energy, in accordance with some embodiments of the present disclosure. As shown in FIG. 7, the method 700 may include receiving information regarding the geometry of the system (block 710). For example, the pole configuration device may receive information regarding the geometry of the system, as described above. For example, to appropriately control the polarity of the electromagnets, the pole configuration device may determine a current and a future position of one or more rotors and the associated electromagnets (e.g., relative to one or more stators) and the associated electromagnets.

In some implementations, the pole configuration device may receive an instruction to position a rotor a certain way. The pole configuration device may cause the rotor to be oriented in a known position. For example, the movement of the rotor can be performed by the pole configuration device manipulating a magnetic polarity of the electromagnets to move the rotor to the known orientation through the attractive and/or repulsive forces generated by the electromagnets. As another example, the movement of the rotor can also be accomplished by attaching a separate motor to the shaft of the rotor and enabling the pole configuration device to control the operation of the separate motor to rotate the rotor shaft to the known orientation.

As further shown in FIG. 7, the method 700 may include receiving information regarding the initial rotor orientation (block 720). As an example, the pole configuration device may receive information regarding the initial rotor orientation, as described above.

As further shown in FIG. 7, the method 700 may include receiving information regarding the rotational speed of the rotor (block 730). For example, the pole configuration device may receive information regarding the rotational speed of the rotor (e.g., via manual user input, a mechanical speed measuring device attached to the shaft, an electronic speed measuring device attached to the rotor shaft, and/or or any other appropriate method), as described above.

As further shown in FIG. 7, the method 700 may include determining a future rotor orientation (block 740). For example, the pole configuration device may determine a future rotor orientation (e.g., using any appropriate mathematical technique involving the information related to the geometry of the system, manual input from a user, and/or or any other appropriate method), as described above.

As further shown in FIG. 7, the method 700 may include determining a future magnetic polarity of the electromagnets of the system such that the attractive and/or repulsive forces generated by the future magnetic polarities cause the rotor to rotate based on the determined future position of the rotor (block 750). As an example, the pole configuration device may determine a future magnetic polarity of the electromagnets of the system such that the attractive and/or repulsive forces generated by the future magnetic polarities cause the rotor to rotate based on the determined future position of the rotor, as described above.

FIG. 8 is a flowchart of an example method associated with controlling torque, speed, or power of a multipolar electric machine, in accordance with some embodiments of the present disclosure. As shown in FIG. 8, the method 800 may include receiving information associated with a rotor position reference of a rotor (block 810). For example, the pole configuration device may receive information associated with a rotor position reference of a rotor of the multipolar electric machine, as described above.

As further shown in FIG. 8, the method 800 may include receiving information associated with an actual rotor position of the rotor (block 820). For example, the pole configuration device may receive information associated with an actual rotor position of the rotor of the multipolar electric machine, as described above.

As further shown in FIG. 8, the method 800 may include moving the rotor to the reference position (block 830). For example, the pole configuration device may cause the rotor of the multipolar electric machine to move to the rotor reference position, as described above.

As further shown in FIG. 8, the method 800 may include receiving information associated with at least one of a torque reference, a speed reference, a current reference, and/or a voltage reference (block 840). For example, the pole configuration device may receive information associated with at least one of a torque reference, a speed reference, a current reference, and/or a voltage reference associated with the multipolar electric machine, as described above.

As further shown in FIG. 8, the method 800 may include receiving information associated with at least one of an actual torque, an actual speed, an actual current, and/or an actual voltage (block 850). For example, the pole configuration device may receive information associated with at least one of an actual torque, an actual speed, an actual current, and/or an actual voltage associated with the multipolar electric machine, as described above.

As further shown in FIG. 8, the method 800 may include polarizing, using an appropriate duty cycle, at least one magnetic pole (block 860). For example, the pole configuration device may polarize using an appropriate duty cycle, at least one magnetic pole associated with the multipolar electric machine, as described above.

Although FIGS. 5-8 show example blocks of process 500 and/or methods 600, 700, and 800, in some implementations, process 500 and/or methods 600, 700, and 800 may include additional blocks, fewer blocks, different blocks, or differently arranged blocks than those depicted in FIGS. 5-8. Additionally, or alternatively, two or more of the blocks of process 500 and/or methods 600, 700, and 800 may be performed in parallel. The process 500 and/or methods 600, 700, and 800 are examples of one process and/or methods that may be performed by one or more devices described herein. These one or more devices may perform one or more other processes based on operations described herein, such as the operations described in connection with FIGS. 1A-1R. Moreover, while the process 500 and/or the methods 600, 700, and 800 have been described in relation to the devices and components of the preceding figures, the process 500 and/or the methods 600, 700, and 800 can be performed using alternative, additional, or fewer devices and/or components. Thus, the process 500 and/or the methods 600, 700, and 800 are not limited to being performed with the example devices, components, hardware, and software explicitly enumerated in the preceding figures. Additionally, or alternatively, the systems, methods, and/or processes described herein may be performed for a plurality of rotors and/or a plurality of stators simultaneously.

The foregoing disclosure provides illustration and description but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for dynamically controlling pole configurations of an electric machine, comprising:
   a field circuit, of the electric machine, including multiple virtual poles;
   an armature circuit of the electric machine;
   one or more memories; and
   one or more processors, communicatively coupled to the one or more memories, configured to:
      receive input data indicating information associated with the electric machine;
      determine, based on the input data, a desired pole configuration of the electric machine; and
      control, based on the desired pole configuration, magnetic polarities of the multiple virtual poles and an armature configuration of the armature circuit to create a set of effective poles,
         wherein the set of effective poles includes one or more virtual poles, of the multiple virtual poles, that are associated with generating at least one of a flux, a speed, a torque, or a power related to the electric machine.

2. The system of claim 1, wherein to control the armature configuration of the armature circuit, the controller is configured to:
   select, based on the desired pole configuration, the armature configuration from a set of armature configurations of the armature circuit.

3. The system of claim 1, wherein the one or more virtual poles include a group of virtual poles that have a matching magnetic polarity.

4. The system of claim 1, wherein the one or more virtual poles include a group of virtual poles that are located consecutively in the field circuit.

5. The system of claim 1, wherein the one or more virtual poles include:
   at least one virtual pole having a first magnetic polarity,
   at least one virtual pole having a second magnetic polarity that is different than the first magnetic polarity, and
   at least one virtual pole having a zero magnetic polarity.

6. The system of claim 1, wherein the magnetic polarities of the one or more virtual poles are based on at least one of:
   a constant current input,
   a linear current input,
   a non-linear current input, or
   an impulse current input.

7. The system of claim 1, further comprising:

one or more rotors; and one or more stators, wherein the multiple virtual poles are located on the one or more rotors and the one or more stators.

8. A method for dynamically controlling pole configurations of an electric machine, comprising:

receiving, by a controller, input data indicating information associated with the electric machine;

determining, by the controller and based on the input data, one or more desired pole numbers of the electric machine; and setting, based on the one or more desired pole numbers, magnetic polarities of multiple virtual poles, included in a field circuit of the machine, and an armature circuit of the electric machine, to create one or more effective poles, wherein the one or more effective poles include one or more virtual poles, of the multiple virtual poles, that are associated with generating at least one of a flux, a speed, a torque, or a power related to the electric machine.

9. The method of claim 8, further comprising:

determining, based on the input data, at least one of a desired flux, a desired speed, a desired torque, or a desired power associated with the electric machine, wherein the desired pole number is based on the at least one of the desired flux, the desired speed, the desired torque, or the desired power.

10. The method of claim 8, wherein setting, based on the desired pole numbers, the magnetic polarities of the multiple virtual poles to create the one or more effective poles comprises:

controlling the magnetic polarities via at least one of:

a constant current input, a linear current input, a non-linear current input, or an impulse current input.

11. The method of claim 8, further comprising:

receiving second input data;

determining, based on the second input data, an adjusted desired pole number of the electric machine;

adjusting, based on the adjusted desired pole number, the magnetic polarities of the multiple virtual poles and an armature configuration, of the one or more armature configurations, to create one or more adjusted effective poles, wherein the one or more adjusted effective poles include a subset of virtual poles, of the multiple virtual poles, that are associated with generating at least one of an adjusted flux, an adjusted speed, an adjusted torque, or an adjusted power associated with the electrical machine.

12. The method of claim 8, wherein desired pole number is based on one or more operating parameters associated with the electric machine.

13. The method of claim 8, wherein the electric machine is at least one of:

a brushless direct current (BLDC), or a brushless alternating current (BLAC) motor.

14. A non-transitory computer-readable medium storing a set of instructions, the set of instructions comprising:

one or more instructions that, when executed by one or more processors of a pole configuration device, cause the pole configuration device to:

receive input data indicating information associated with an electric machine;

determine, based on the input data, a desired pole configuration of the electric machine;

control, based on the desired pole configuration, magnetic polarities of multiple virtual poles, included in a field circuit of the electric machine, and an armature circuit, of the electric machine, for a first time period to create a first set of effective poles and a second time period to create a second set of effective poles;

wherein the first set of effective poles includes a first set of virtual poles, of the multiple virtual poles, that are associated with generating at least one of a first flux, a first speed, a first torque, or a first power related to the electric machine, and wherein the second set of effective poles includes a second set of virtual poles, of the multiple virtual poles, that are associated with generating at least one of a second flux, a second speed, a second torque, or a second power related to the electric machine.

15. The non-transitory computer-readable medium of claim 14, wherein the armature circuit is associated with a first armature configuration during the first time period and a second armature configuration during the second time period.

16. The non-transitory computer-readable medium of claim 14, wherein the desired pole configuration is based on at least one of:

a desired speed, a desired torque, or a desired power.

17. The non-transitory computer-readable medium of claim 14, wherein the first set of virtual poles and the second set of virtual poles are located adjacent to one another.

18. The non-transitory computer-readable medium of claim 14, wherein the first set of effective poles is associated with a first pole number of the electric machine, and wherein the second set of effective poles is associated with a second pole number of the electric machine that is different than the first pole number.

19. The non-transitory computer-readable medium of claim 14, wherein magnetic polarities of the first set of virtual poles and magnetic polarities of the second set of virtual poles are based on at least one of:

a constant current input, a linear current input, a non-linear current input, or an impulse current input.

20. The non-transitory computer-readable medium of claim 14, wherein the first set of virtual poles is associated with a first magnetic strength, and wherein the second set of virtual poles is associated with a second magnetic strength that is different than the first magnetic strength.

\* \* \* \* \*